United States Patent
Li et al.

(10) Patent No.: US 12,349,114 B2
(45) Date of Patent: Jul. 1, 2025

(54) COMMUNICATION METHOD AND COMMUNICATION APPARATUS

(71) Applicant: HUAWEI TECHNOLOGIES CO., LTD., Guangdong (CN)

(72) Inventors: Shengyu Li, Beijing (CN); Lei Guan, Beijing (CN); Ruixiang Ma, Shenzhen (CN); Yuan Li, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 442 days.

(21) Appl. No.: 17/513,883

(22) Filed: Oct. 29, 2021

(65) Prior Publication Data
US 2022/0053489 A1 Feb. 17, 2022

Related U.S. Application Data

(63) Continuation of application No. PCT/CN2020/085230, filed on Apr. 17, 2020.

(30) Foreign Application Priority Data

Apr. 30, 2019 (CN) .......................... 201910364288.3

(51) Int. Cl.
*H04W 72/0446* (2023.01)
*H04W 72/23* (2023.01)

(52) U.S. Cl.
CPC ....... *H04W 72/0446* (2013.01); *H04W 72/23* (2023.01)

(58) Field of Classification Search
CPC H04W 72/0446; H04W 72/23; H04L 5/0053; H04L 5/0094; H04L 5/0044
See application file for complete search history.

(56) References Cited

U.S. PATENT DOCUMENTS

2019/0029046 A1 1/2019 Li et al.
2019/0045536 A1 2/2019 Gao et al.
(Continued)

FOREIGN PATENT DOCUMENTS

CN 108882366 A 11/2018
CN 109152072 A 1/2019
(Continued)

OTHER PUBLICATIONS

R1-1612357, InterDigital Communications, MAC Layer Impact of Supporting Different Numerologies, 3GPP TSG-RAN WG1 #87, Reno, Nevada Nov. 14-18, 2016, 4 pages.
(Continued)

*Primary Examiner* — Sharmin Chowdhury

(57) ABSTRACT

This application provides a communication method and a communication apparatus. The communication method includes: receiving first DCI at a first receiving position in at least one receiving position, where the first DCI includes first information, the first information indicating time domain resource allocation, and the at least one receiving position is located in a same slot; performing transmission of a data channel, with the network device, on an $i^{th}$ first-type time domain resource in M first-type time domain resources, where a difference between the $i^{th}$ first-type time domain resource and an $i^{th}$ reference symbol is equal to a starting symbol of an $i^{th}$ time domain resource in a first time domain resource set, a length of the $i^{th}$ first-type time domain resource is equal to a length of the $i^{th}$ time domain resource in the first time domain resource set.

6 Claims, 6 Drawing Sheets

(56) References Cited

U.S. PATENT DOCUMENTS

| | | | | |
|---|---|---|---|---|
| 2021/0058949 | A1* | 2/2021 | Kim | H04W 72/23 |
| 2021/0227418 | A1* | 7/2021 | Hwang | H04W 72/0446 |
| 2022/0110128 | A1* | 4/2022 | Takahashi | H04L 5/0044 |
| 2022/0159652 | A1* | 5/2022 | Bae | H04W 72/0446 |
| 2022/0159692 | A1* | 5/2022 | Lee | H04L 5/0053 |
| 2023/0362967 | A1* | 11/2023 | Baldemair | H04W 72/0453 |

FOREIGN PATENT DOCUMENTS

| | | |
|---|---|---|
| CN | 109600836 A | 4/2019 |
| CN | 109600846 A | 4/2019 |

OTHER PUBLICATIONS

3GPP TSG-RAN WG1 Meeting #96, R1-1903480, Summary of Tuesday offline discussion on potential enhancements for PUSCH for NR URLLC (AI 7.2.6.1.3), Nokia, Nokia Shanghai Bell, Athens, Greece, Feb. 25, Mar. 1, 2019, total 30 pages.

3GPP TS 38.212 V15.5.0 (Mar. 2019), 3rd Generation Partnership Project; Technical Specification Group Radio Access Network; NR; Multiplexing and channel coding(Release 15), 101 pages.

3GPP TSG RAN WG1 #96bis, R1-1904188, On PUSCH enhancements for NR URLLC, Panasonic, Xi an, China, Apr. 8, 12, 2019, total 6 pages.

3GPP TS 38.213 V15.5.0 (Mar. 2019), 3rd Generation Partnership Project; Technical Specification Group Radio Access Network; NR; Physical layer procedures for control(Release 15), 104 pages.

3GPP TS 38.214 V15.5.0 (Mar. 2019), 3rd Generation Partnership Project; Technical Specification Group Radio Access Network; NR; Physical layer procedures for data(Release 15), 103 pages.

3GPP TS 38.331 V15.5.1 (Apr. 2019), 3rd Generation Partnership Project; Technical Specification Group Radio Access Network; NR; Radio Resource Control (RRC) protocol specification(Release 15), 491 pages.

"3rd Generation Partnership Project; Technical Specification Group Radio Access Network; NR; Physical layer procedures for data (Release 15)", 3GPP Standard; Technical Specification; 3GPP TS 38.214, No. V15.5.0, Mar. 27, 2019 (Mar. 27, 2019), pp. 1-103, XP051722951.

Huawei et al: "Compact DCI for URLLC", 3GPP Draft; R1-1903077, Feb. 16, 2019, XP051600773, total 8 pages.

Huawei et al: "UCI enhancements for URLLC", 3GPP Draft; R1-1900044, Jan. 12, 2019, XP051575670, total 8 pages.

* cited by examiner

COMMUNICATION METHOD AND COMMUNICATION APPARATUS

CROSS-REFERENCE TO RELATED APPLICATIONS

This application is a continuation of International Patent Application No. PCT/CN2020/085230, filed on Apr. 17, 2020, which claims priority to Chinese Patent Application No. 201910364288.3, filed on Apr. 30, 2019. The disclosures of the aforementioned applications are hereby incorporated by reference in their entireties.

TECHNICAL FIELD

This application relates to the communication field, and in particular, to a communication method and a communication apparatus.

BACKGROUND

With development of communication technologies, system performance of a 5th generation (5th Generation, 5G) communication system is continuously improved, and a plurality of service types, different deployment scenarios, and a wider spectrum range are supported. For example, the service types include enhanced mobile broadband (enhanced mobile broadband, eMBB), massive machine type communication (massive machine type communication, mMTC), ultra-reliable low-latency communication (ultra-reliable and low-latency communication, URLLC), a multimedia broadcast multicast service (multimedia broadcast multicast service, MBMS), and a positioning service. Compared with a 4G communication system, the 5G communication system supports the URLLC service.

Currently, data transmission in new radio (new radio, NR) is generally based on control-data separation. To be specific, before each time of data transmission, corresponding control information indicates some or all parameters of the data transmission. Therefore, reliability of URLLC service transmission relates to both reliability of control information transmission and reliability of data transmission. Control information for scheduling data transmission in NR is referred to as downlink control information (downlink control information, DCI), and is carried on a physical downlink control channel (physical downlink control channel, PDCCH). Main factors that affect reliability of DCI transmission are a payload size (payload size) of the DCI and a quantity of time-frequency resources occupied by the PDCCH. The two factors jointly determine a coding rate of the DCI transmission.

Therefore, by reducing the payload size of the DCI, the coding rate can be reduced, and the reliability of DCI transmission can be improved. For example, a width of a time domain resource allocation (time domain resource allocation, TDRA) field in the DCI may be reduced, to reduce DCI overheads. However, optional time domain positions corresponding to the TDRA after the width is reduced are also reduced, and flexibility and reliability of the data transmission cannot be ensured.

SUMMARY

This application provides a communication method and a communication apparatus, to improve flexibility and reliability of data transmission.

According to a first aspect, a communication method is provided. The method includes:
receiving first DCI at a first receiving position in at least one receiving position, where the first DCI includes first information, the first information is used to indicate time domain resource allocation, and the at least one receiving position is located in a same slot; determining a second time domain resource set based on the first receiving position and a first time domain resource set, where the first time domain resource set includes M time domain resources, the first time domain resource set is predefined or is configured by a higher layer parameter, and M is a positive integer greater than or equal to 2; determining a second time domain resource based on the first information and the second time domain resource set, where the second time domain resource is one of a plurality of time domain resources included in the second time domain resource set; and transmitting a data channel on the second time domain resource.

According to the method in this embodiment of this application, the second time domain resource set is determined based on the first receiving position and the first time domain resource set, the second time domain resource is determined in the second time domain resource set based on the first information, and the data channel is transmitted on the second time domain resource. Because the second time domain resource is associated with the receiving position, flexibility and reliability of data transmission can be improved.

Optionally, that the second time domain resource set is determined based on the first receiving position and the first time domain resource set, and the second time domain resource is determined in the second time domain resource set based on the first information may be: A third time domain resource set is determined based on the first information and the first time domain resource set, and a third time domain resource is determined based on the first receiving position and the third time domain resource set. A sequence of the foregoing operations is not limited in this method.

Optionally, the receiving position is a transmission position of a downlink control channel (for example, a PDCCH), and includes a starting symbol of the receiving position and a length of the receiving position.

Optionally, the receiving position is a transmission position of a downlink control channel for scheduling URLLC data transmission.

Optionally, the at least one receiving position in one slot includes at least two receiving positions. Optionally, the at least one receiving position in one slot includes one receiving position, and a starting symbol of the receiving position is not the $1^{st}$ symbol of the slot.

Optionally, the first time domain resource set is determined by a first time domain resource allocation table, the first time domain resource allocation table includes M rows, and each row is corresponding to one time domain resource. Optionally, downlink data transmission and uplink data transmission each are associated with one first time domain resource allocation table and corresponding to one first time domain resource set. That is, the downlink data transmission and the uplink data transmission are associated with different first time domain resource allocation tables.

Optionally, any row in the first time domain resource allocation table includes a start and length indicator value (start and length indicator value, SLIV), and does not include a scheduling-delay parameter K0 or K2. A sum of a starting symbol number S and a length L in the SLIV is less than a quantity A of symbols in one slot. In this case, one SLIV determines one time domain resource.

Optionally, any row in the first time domain resource allocation table includes an SLIV and a scheduling-delay parameter K0 or K2. A sum of a starting symbol number S and a length L in the SLIV is less than a quantity A of symbols in one slot. The scheduling-delay parameter K0 is used for downlink transmission, and indicates a difference between a number of a slot in which downlink control information DCI is located and a number of a slot in which a scheduled downlink data channel is located. The scheduling-delay parameter K2 is used for uplink transmission, and indicates a difference between the number of the slot in which the downlink control information DCI is located and a number of a slot in which a scheduled uplink data channel is located. In this case, one {SLIV, K0/K2} determines one time domain resource. A starting symbol number S of the time domain resource and a sum of the starting symbol number S and a length L may all be greater than or equal to the quantity A of symbols in one slot.

Optionally, for a normal cyclic prefix configuration, the quantity A in one slot is equal to 14, and for an extended cyclic prefix configuration, the quantity A in one slot is equal to 12.

Optionally, the time domain resource is corresponding to a section of consecutive symbols in time domain. Optionally, the starting symbol number S of the time domain resource is numbered relative to the $1^{st}$ symbol (namely, the symbol 0) of the slot in which the first DCI is located.

Optionally, the transmitting a data channel on the second time domain resource includes: for downlink transmission, receiving a downlink data channel on the second time domain resource; and for uplink transmission, sending an uplink data channel on the second time domain resource.

In some possible implementations, the determining a second time domain resource set based on the first receiving position and a first time domain resource set includes: determining the second time domain resource set based on a first reference symbol and the first time domain resource set, where the first reference symbol is a starting symbol of the first receiving position or the first reference symbol is a sum of an ending symbol of the first receiving position and a first offset, and the first offset is predefined or is configured by a higher layer parameter.

Optionally, for downlink transmission, the first reference symbol is the starting symbol of the first receiving position; and for uplink transmission, the first reference symbol is the sum of the ending symbol of the first receiving position and the first offset.

Optionally, for both downlink transmission and uplink transmission, the first reference symbol is the starting symbol of the first receiving position.

Optionally, the first offset is shortest processing time from receiving of a downlink control channel to sending of an uplink data channel by a terminal device, and is in a unit of symbol. For example, the first offset is processing time N2 in an NR protocol or a sum of a preset offset value and N2. A value of first offset is related to factors such as a subcarrier spacing and a capability type of the terminal device.

In some possible implementations, the determining a second time domain resource set based on the first receiving position and a first time domain resource set includes: determining the second time domain resource set based on a first reference symbol and the first time domain resource set, where a value of the first reference symbol is a first value or a second value, the first value is a symbol 0, the second value is a starting symbol of the first receiving position or the second value is a sum of an ending symbol of the first receiving position and a first offset, and the first offset is predefined or is configured by a higher layer parameter.

Optionally, that the first value is a symbol 0 means that the first reference symbol is the $1^{st}$ symbol of the slot in which the first DCI is located, namely, the symbol 0.

In some possible implementations, the method further includes: receiving a first parameter, where the first parameter indicates that the value of the first reference symbol is the first value or the second value.

Optionally, the first parameter is a radio resource control (radio resource control, RRC) parameter.

In some possible implementations, the terminal device determines a value of the first reference symbol based on a feature of the first time domain resource set or a feature of a first time domain resource allocation table associated with the first time domain resource set. For example, when a quantity of rows included in the first time domain resource set is greater than or equal to a first threshold, the value of the first reference symbol is the first value; or when a quantity of rows included in the first time domain resource set is less than a first threshold, the value of the first reference symbol is the second value, where the first threshold is predefined or is configured by a higher layer parameter. Alternatively, when the first time domain resource allocation table associated with the first time domain resource set includes a parameter for a scheduling-delay between a downlink control channel and a data channel, the value of the first reference symbol is the first value; or when the first time domain resource allocation table associated with the first time domain resource set does not include a parameter for a scheduling-delay between a downlink control channel and a data channel, the value of the first reference symbol is the second value.

Optionally, a value of the first threshold is 5.

Optionally, the value of the first threshold is determined by a width of a time domain resource allocation bit field in the first DCI for scheduling URLLC data transmission.

Optionally, the parameter for a scheduling-delay between the downlink control channel and the data channel is K0 or K2.

In some possible implementations, the determining the second time domain resource set based on a first reference symbol and the first time domain resource set includes: determining M first-type time domain resources, where a difference between a starting symbol of an $i^{th}$ time domain resource in the M first-type time domain resources and the first reference symbol is equal to a starting symbol of an $i^{th}$ time domain resource in the first time domain resource set, and a length of the $i^{th}$ time domain resource in the M first-type time domain resources is equal to a length of the $i^{th}$ time domain resource in the first time domain resource set, where i is a positive integer less than or equal to M; and determining M second-type time domain resources based on the M first-type time domain resources, where the second time domain resource set includes the M second-type time domain resources.

Optionally, a difference between starting symbols of two time domain resources is equivalent to a difference between numbers of the starting symbols of the two time domain resources, or is equivalent to a distance (where the distance is in a unit of a quantity of symbols) of the starting symbols of the two time domain resources.

In some possible implementations, the starting symbol and an ending symbol of the $i^{th}$ first-type time domain resource belong to a same slot, and an $i^{th}$ second-type time domain resource is the $i^{th}$ first-type time domain resource.

Optionally, the $i^{th}$ first-type time domain resource is any one of the M first-type time domain resources, namely, any first-type time domain resource in the M first-type time domain resources, satisfying that a starting symbol and a receiving symbol are located in a same slot.

In some possible implementations, when the starting symbol and an ending symbol of the $i^{th}$ first-type time domain resource do not belong to a same slot, a starting symbol of an $i^{th}$ second-type time domain resource is the starting symbol of the $i^{th}$ first-type time domain resource, and an ending symbol of the $i^{th}$ second-type time domain resource is an ending symbol of a slot in which the starting symbol of the $i^{th}$ first-type time domain resource is located; or when the starting symbol and an ending symbol of the $i^{th}$ first-type time domain resource do not belong to a same slot, a starting symbol of an $i^{th}$ second-type time domain resource is the $1^{st}$ symbol of a slot next to a slot in which the starting symbol of the $i^{th}$ first-type time domain resource is located, and a length of the $i^{th}$ second-type time domain resource is equal to a length of the $i^{th}$ first-type time domain resource.

Optionally, when the starting symbol and the ending symbol of the $i^{th}$ first-type time domain resource do not belong to one slot, the $i^{th}$ second-type time domain resource is empty. In other words, when the starting symbol and the ending symbol of the $i^{th}$ first-type time domain resource do not belong to one slot, the corresponding $i^{th}$ second-type time domain resource is a virtual time domain resource that does not exist. Correspondingly, when the second time domain resource indicated by the first information is the $i^{th}$ second-type time domain resource, the terminal device and a network device do not need to send and receive data on the second time domain resource.

In some possible implementations, the method further includes: determining a first downlink data transmission occasion set based on the second time domain resource set, where a quantity of downlink data transmission occasions included in the first downlink data transmission occasion set is equal to a maximum quantity of non-overlapping time domain resources included in the second time domain resource set; determining a second downlink data transmission occasion set, where the second downlink data transmission occasion set is a union set of at least one first downlink data transmission occasion set, and the at least one first downlink data transmission occasion set is determined based on at least one second time domain resource set corresponding to the at least one receiving position that is in the same slot; generating a first codebook, where the first codebook is corresponding to feedback information of a downlink data transmission occasion in the second downlink data transmission occasion set; and sending the first codebook in a first uplink time unit, where the first uplink time unit is an uplink slot or sub-slot, the first uplink time unit is determined based on second information, and the first DCI includes the second information.

Optionally, the maximum quantity of non-overlapping time domain resources included in the second time domain resource set means that K1 time domain resources are selected from the second time domain resource set, and any two of the K1 time domain resources do not overlap. The maximum quantity of non-overlapping time domain resources is equal to a maximum value of K1 that can be found.

Optionally, before the maximum quantity of non-overlapping time domain resources included in the second time domain resource set is determined, a new second time domain resource set is obtained after each time domain resource in the second time domain resource set is translated to one slot, and a maximum quantity of non-overlapping time domain resources included in the new second time domain resource set is determined.

For example, for a second time domain resource in the second time domain resource set, if a starting symbol number S is greater than or equal to n*A and less than (n+1)*A, where A is a quantity (for example, 14) of symbols in one slot, a starting symbol S' of a time domain resource obtained after the second time domain resource is translated is S−n*A.

Optionally, the terminal device determines a first uplink control channel resource based on a size of the first codebook, and sends the first codebook on the first uplink control channel resource in the first uplink time unit.

In some possible implementations, the method further includes: determining a third time domain resource set, where the third time domain resource set is a union set of at least one second time domain resource set corresponding to the at least one receiving position that is in the same slot; determining a third downlink data transmission occasion set, where a quantity of downlink data transmission occasions included in the third downlink data transmission occasion set is equal to a maximum quantity of non-overlapping time domain resources included in the third time domain resource set; generating a second codebook, where the second codebook is corresponding to feedback information of all downlink data transmission occasions in the third downlink data transmission occasion set; and sending the second codebook in a second uplink time unit, where the second uplink time unit is an uplink slot or sub-slot, the second uplink time unit is determined based on third information, and the first DCI includes the third information.

Similarly, the maximum quantity of non-overlapping time domain resources included in the third time domain resource set means that K2 time domain resources are selected from the third time domain resource set, and any two of the K2 time domain resources do not overlap. The maximum quantity of non-overlapping time domain resources is equal to a maximum value of K2 that can be found.

Optionally, before the maximum quantity of non-overlapping time domain resources included in the third time domain resource set is determined, a new third time domain resource set is obtained after each time domain resource in the third time domain resource set is translated to one slot, and a maximum quantity of non-overlapping time domain resources included in the new third time domain resource set is determined. For a third time domain resource in the third time domain resource set, if a starting symbol S is greater than or equal to n*A and less than (n+1)*A, where A is a quantity of symbols in one slot, a starting symbol S' of a time domain resource obtained after the third time domain resource is translated is S−n*A.

Optionally, the terminal device determines a second uplink control channel resource based on a size of the second codebook, and sends the second codebook on the second uplink control channel resource in the second uplink time unit.

In some possible implementations, the first DCI is used to schedule ultra-reliable low-latency communication URLLC data; the first DCI is DCI in a first format, where a payload of the DCI in the first format is the smallest in payloads of all formats of DCI for scheduling data transmission, or a value of a DCI format indicator bit field of the first DCI is a second value, where the second value is predefined; a radio network temporary identifier RNTI of the first DCI is a first RNTI, where the first RNTI is an RNTI other than a cell radio network temporary identifier C-RNTI or a configured scheduling radio network temporary identifier CS-RNTI, where for example, the first RNTI is a modulation and coding scheme-cell-RNTI, namely, a MCS-C-RNTI; a search space in which the first DCI is located belongs to a first search space, where the first search space is predefined or is configured by a higher layer parameter; a control resource set in which the first DCI is located belongs to a first control resource set, where the first control resource set is predefined or is configured by a higher layer parameter; or a value of a first bit field in the first DCI is a first value, where the first bit field is used to indicate a priority or service type of data scheduled by the DCI.

Optionally, the at least one receiving position in one slot is a receiving position used to receive DCI for scheduling ultra-reliable low-latency data transmission. That is, the at least one receiving position in one slot is a time domain position used to transmit the first DCI.

Optionally, the first time domain resource set or the first time domain resource allocation table associated with the first time domain resource set is used to schedule ultra-reliable low-latency data transmission. To be specific, the first time domain resource allocation table is corresponding to the first DCI, and the width of the time domain resource allocation bit field in the first DCI is corresponding to a quantity of rows included in the first time domain resource allocation table.

According to a second aspect, a communication method is provided. The method includes: sending first DCI at a first receiving position in at least one receiving position, where the first DCI includes first information, the first information indicates time domain resource allocation, and the at least one receiving position is located in a same slot; and transmitting a data channel on a second time domain resource, where the second time domain resource is determined based on the first information and a second time domain resource set, and the second time domain resource set is determined based on the first receiving position and a first time domain resource set, where the first time domain resource set includes M time domain resources, the first time domain resource set is predefined or is configured by a higher layer parameter, and M is a positive integer greater than or equal to 2.

According to the method in this embodiment of this application, the second time domain resource set is determined based on the first receiving position and the first time domain resource set, the second time domain resource is determined in the second time domain resource set based on the first information, and the data channel is transmitted on the second time domain resource. Because the second time domain resource is associated with the receiving position, flexibility and reliability of data transmission can be improved.

Optionally, the receiving position is a downlink control channel transmission position, and includes a starting symbol of the receiving position and a length of the receiving position. Optionally, the receiving position is a transmission position of a downlink control channel for scheduling URLLC data transmission.

Optionally, the at least one receiving position in one slot includes at least two receiving positions. Optionally, the at least one receiving position in one slot includes one receiving position, and a starting symbol of the receiving position is not the $1^{st}$ symbol of the slot.

Optionally, the first time domain resource set is determined by a first time domain resource allocation table, the first time domain resource allocation table includes M rows, and each row is corresponding to one time domain resource. Optionally, downlink data transmission and uplink data transmission each are associated with one first time domain resource allocation table and corresponding to one first time domain resource set. That is, the downlink data transmission and the uplink data transmission are associated with different first time domain resource allocation tables.

Optionally, any row in the first time domain resource allocation table includes a start and length indicator value (starting and length indicator value, SLIV), and does not include a scheduling-delay parameter K0 or K2. A sum of a starting symbol number S and a length L in the SLIV is less than a quantity A of symbols in one slot. In this case, one SLIV determines one time domain resource.

Optionally, any row in the first time domain resource allocation table includes an SLIV and a scheduling-delay parameter K0 or K2. A sum of a starting symbol number S and a length L in the SLIV is less than a quantity A of symbols in one slot. The scheduling-delay parameter K0 is used for downlink transmission, and indicates a difference between a number of a slot in which downlink control information DCI is located and a number of a slot in which a scheduled downlink data channel is located. The scheduling-delay parameter K2 is used for uplink transmission, and indicates a difference between the number of the slot in which the downlink control information DCI is located and a number of a slot in which a scheduled uplink data channel is located. In this case, one {SLIV, K0/K2} determines one time domain resource. A starting symbol number S of the time domain resource and a sum of the starting symbol number S and a length L may be greater than or equal to the quantity A of symbols in one slot.

Optionally, for a normal cyclic prefix configuration, the quantity A in one slot is equal to 14, and for an extended cyclic prefix configuration, the quantity A in one slot is equal to 12.

Optionally, the time domain resource is corresponding to a section of consecutive symbols in time domain. Optionally, the starting symbol number S of the time domain resource is numbered relative to the $1^{st}$ symbol (namely, the symbol 0) of the slot in which the first DCI is located.

Optionally, the transmitting a data channel on the second time domain resource includes: for downlink transmission, receiving a downlink data channel on the second time domain resource; and for uplink transmission, sending an uplink data channel on the second time domain resource.

In some possible implementations, the method further includes: determining the second time domain resource set based on a first reference symbol and the first time domain resource set.

In some possible implementations, the first reference symbol is a starting symbol of the first receiving position or the first reference symbol is a sum of an ending symbol of the first receiving position and a first offset, and the first offset is predefined or is configured by a higher layer parameter.

Optionally, for downlink transmission, the first reference symbol is the starting symbol of the first receiving position; and for uplink transmission, the first reference symbol is the sum of the ending symbol of the first receiving position and the first offset.

Optionally, for both downlink transmission and uplink transmission, the first reference symbol is the starting symbol of the first receiving position.

Optionally, the first offset is shortest processing time from receiving of a downlink control channel to sending of an uplink data channel by a terminal device, and is in a unit of symbol. For example, the first offset is processing time N2 in an NR protocol or a sum of a preset offset value and N2. A value of first offset is related to factors such as a subcarrier spacing and a capability type of the terminal device.

In some possible implementations, the method further includes: sending a first parameter, where a value of the first parameter indicates that a value of the first reference symbol is a first value or a second value, where the first value is a symbol 0, the second value is a starting symbol of the first receiving position or the second value is a sum of an ending symbol of the first receiving position and a first offset, and the first offset is predefined or is configured by a higher layer parameter.

Optionally, that the first value is a symbol 0 means that the first reference symbol is the $1^{st}$ symbol of the slot in which the first DCI is located, namely, the symbol 0.

Optionally, the first parameter is a radio resource control (radio resource control, RRC) parameter.

In some possible implementations, the terminal device determines a value of the first reference symbol based on a feature of the first time domain resource set or a feature of a first time domain resource allocation table associated with the first time domain resource set. For example, when a quantity of rows included in the first time domain resource set is greater than or equal to a first threshold, the value of the first reference symbol is the first value; or when a quantity of rows included in the first time domain resource set is less than a first threshold, the value of the first reference symbol is the second value, where the first threshold is predefined or is configured by a higher layer parameter. Alternatively, when the first time domain resource allocation table associated with the first time domain resource set includes a parameter for a scheduling-delay between a downlink control channel and a data channel, the value of the first reference symbol is the first value; or when the first time domain resource allocation table associated with the first time domain resource set does not include a parameter for a scheduling-delay between a downlink control channel and a data channel, the value of the first reference symbol is the second value. The first value is the symbol 0, the second value is the starting symbol of the first receiving position or the second value is the sum of the ending symbol of the first receiving position and the first offset, and the first offset is predefined or is configured by the higher layer parameter.

Optionally, a value of the first threshold is 5.

Optionally, the value of the first threshold is determined by a width of a time domain resource allocation bit field in the first DCI for scheduling URLLC data transmission.

Optionally, the parameter for a scheduling-delay between the downlink control channel and the data channel is K0 or K2.

In some possible implementations, the determining the second time domain resource set based on a first reference symbol and the first time domain resource set includes: determining M first-type time domain resources, where a difference between a starting symbol of an $i^{th}$ time domain resource in the M first-type time domain resources and the first reference symbol is equal to a starting symbol of an $i^{th}$ time domain resource in the first time domain resource set, and a length of the $i^{th}$ time domain resource in the M first-type time domain resources is equal to a length of the $i^{th}$ time domain resource in the first time domain resource set, where i and M are positive integers, and i is less than or equal to M; and determining M second-type time domain resources based on the M first-type time domain resources, where the second time domain resource set includes the M second-type time domain resources.

Optionally, a difference between starting symbols of two time domain resources is equivalent to a difference between numbers of the starting symbols of the two time domain resources, or is equivalent to a distance (where the distance is in a unit of a quantity of symbols) of the starting symbols of the two time domain resources.

In some possible implementations, the starting symbol and an ending symbol of the $i^{th}$ first-type time domain resource belong to a same slot, and an $i^{th}$ second-type time domain resource is the $i^{th}$ first-type time domain resource.

Optionally, the $i^{th}$ first-type time domain resource is any one of the M first-type time domain resources, namely, any first-type time domain resource in the M first-type time domain resources, satisfying that a starting symbol and a receiving symbol are located in a same slot.

In some possible implementations, when the starting symbol and an ending symbol of the $i^{th}$ first-type time domain resource do not belong to a same slot, a starting symbol of an $i^{th}$ second-type time domain resource is the starting symbol of the $i^{th}$ first-type time domain resource, and an ending symbol of the $i^{th}$ second-type time domain resource is an ending symbol of a slot in which the starting symbol of the $i^{th}$ first-type time domain resource is located; or when the starting symbol and an ending symbol of the $i^{th}$ first-type time domain resource do not belong to a same slot, a starting symbol of an $i^{th}$ second-type time domain resource is the $1^{st}$ symbol of a slot next to a slot in which the starting symbol of the $i^{th}$ first-type time domain resource is located, and a length of the $i^{th}$ second-type time domain resource is equal to a length of the $i^{th}$ first-type time domain resource.

Optionally, when the starting symbol and the ending symbol of the $i^{th}$ first-type time domain resource do not belong to one slot, the $i^{th}$ second-type time domain resource is empty. In other words, when the starting symbol and the ending symbol of the $i^{th}$ first-type time domain resource do not belong to one slot, the corresponding $i^{th}$ second-type time domain resource is a virtual time domain resource that does not exist. Correspondingly, when the second time domain resource indicated by the first information is the $i^{th}$ second-type time domain resource, the terminal device and a network device do not need to send and receive data on the second time domain resource.

In some possible implementations, the method further includes: determining a first downlink data transmission occasion set based on the second time domain resource set, where a quantity of downlink data transmission occasions included in the first downlink data transmission occasion set is equal to a maximum quantity of non-overlapping time domain resources included in the second time domain resource set; determining a second downlink data transmission occasion set, where the second downlink data transmission occasion set is a union set of at least one first downlink data transmission occasion set, and the at least one first downlink data transmission occasion set is determined based on at least one second time domain resource set corresponding to the at least one receiving position that is in the same slot; and receiving a first codebook, where the first codebook is corresponding to feedback information of a downlink data transmission occasion in the second downlink data transmission occasion set.

Optionally, a first uplink control channel resource is determined, where the first uplink control channel resource is corresponding to a size of the first codebook, and the first codebook is received on the first uplink control channel resource in a first uplink time unit.

Optionally, after the first codebook is received in the first uplink time unit, decoding is performed based on the size of the first codebook.

Optionally, before the maximum quantity of non-overlapping time domain resources included in the second time domain resource set is determined, a new second time domain resource set is obtained after each time domain resource in the second time domain resource set is translated to one slot, and a maximum quantity of non-overlapping time domain resources included in the new second time domain resource set is determined.

For example, for a second time domain resource in the second time domain resource set, if a starting symbol number S is greater than or equal to n*A and less than (n+1)*A, where A is a quantity (for example, 14) of symbols in one slot, a starting symbol S' of a time domain resource obtained after the second time domain resource is translated is S−n*A.

In some possible implementations, the method further includes: determining a third time domain resource set, where the third time domain resource set is a union set of at least one second time domain resource set corresponding to the at least one receiving position that is in the same slot; determining a third downlink data transmission occasion set, where a quantity of downlink data transmission occasions included in the third downlink data transmission occasion set is equal to a maximum quantity of non-overlapping time domain resources included in the third time domain resource set; and receiving a second codebook, where the second codebook is corresponding to feedback information of all downlink data transmission occasions in the third downlink data transmission occasion set.

Optionally, a second uplink control channel resource is determined, where the second uplink control channel resource is corresponding to a size of the second codebook, and the second codebook is received on the second uplink control channel resource in a second uplink time unit.

Optionally, after the second codebook is received in the second uplink time unit, decoding is performed based on the size of the second codebook.

Optionally, before the maximum quantity of non-overlapping time domain resources included in the third time domain resource set is determined, a new third time domain resource set is obtained after each time domain resource in the third time domain resource set is translated to one slot, and a maximum quantity of non-overlapping time domain resources included in the new third time domain resource set is determined. For a third time domain resource in the third time domain resource set, if a starting symbol S is greater than or equal to n*A and less than (n+1)*A, where A is a quantity of symbols in one slot, a starting symbol S' of a time domain resource obtained after the third time domain resource is translated is S−n*A.

In some possible implementations, the first DCI is used to schedule ultra-reliable low-latency communication URLLC data; the first DCI is DCI in a first format, where a payload of the DCI in the first format is the smallest in payloads of all formats of DCI for scheduling data transmission, or a value of a DCI format indicator bit field of the first DCI is a second value, where the second value is predefined; a radio network temporary identifier RNTI of the first DCI is a first RNTI, where the first RNTI is an RNTI other than a cell radio network temporary identifier C-RNTI or a configured scheduling radio network temporary identifier CS-RNTI, where for example, the first RNTI is a modulation and coding scheme-cell-RNTI, namely, a MCS-C-RNTI; a search space in which the first DCI is located belongs to a first search space, where the first search space is predefined or is configured by a higher layer parameter; a control resource set in which the first DCI is located belongs to a first control resource set, where the first control resource set is predefined or is configured by a higher layer parameter; or a value of a first bit field in the first DCI is a first value, where the first bit field is used to indicate a priority or service type of data scheduled by the DCI.

Optionally, the at least one receiving position in one slot is a receiving position used to receive DCI for scheduling ultra-reliable low-latency data transmission. That is, the at least one receiving position in one slot is a time domain position used to transmit the first DCI.

Optionally, the first time domain resource set or the first time domain resource allocation table associated with the first time domain resource set is used to schedule ultra-reliable low-latency data transmission. To be specific, the first time domain resource allocation table is corresponding to the first DCI, and the width of the time domain resource allocation bit field in the first DCI is corresponding to a quantity of rows included in the first time domain resource allocation table.

According to a third aspect, a communication method is provided. The method includes: receiving first DCI at a first receiving position in at least one receiving position, where the first DCI includes first information, the first information is used to indicate time domain resource allocation, and the at least one receiving position is located in a same slot; determining a second time domain resource set based on the first receiving position and a first time domain resource set, where the first time domain resource set includes M time domain resources, the first time domain resource set is predefined or is configured by a higher layer parameter, and M is a positive integer greater than or equal to 2; determining a second time domain resource based on the first information and the second time domain resource set, where the second time domain resource is one of a plurality of time domain resources included in the second time domain resource set; and transmitting a data channel on the second time domain resource.

According to the method in this embodiment of this application, the second time domain resource set is determined based on the first receiving position and the first time domain resource set, the second time domain resource is determined in the second time domain resource set based on the first information, and the data channel is transmitted on the second time domain resource. Because the second time domain resource is associated with the receiving position, flexibility and reliability of data transmission can be improved.

Optionally, descriptions of the receiving position, the first time domain resource set, and the time domain resource are the same as those in the first aspect, and details are not described herein again.

In some possible implementations, the determining a second time domain resource set based on the first receiving position and a first time domain resource set includes: determining M first-type time domain resources, where a difference between a starting symbol of an $i^{th}$ time domain resource in the M first-type time domain resources and an $i^{th}$ reference symbol is equal to a starting symbol of an $i^{th}$ time domain resource in the first time domain resource set, and a length of the $i^{th}$ time domain resource in the M first-type time domain resources is equal to a length of the $i^{th}$ time domain resource in the first time domain resource set, where i is a positive integer less than or equal to M, and the $i^{th}$ reference symbol is determined by a first parameter associated with the $i^{th}$ time domain resource in the first time domain resource set; and determining K second-type time domain resources based on the M first-type time domain resources, and determining K third-type time domain resources based on the K second-type time domain resources, where the second time domain resource set includes the K third-type time domain resources, and K is a positive integer less than or equal to M.

Optionally, a difference between starting symbols of two time domain resources is equivalent to a difference between numbers of the starting symbols of the two time domain resources, or is equivalent to a distance (where the distance is in a unit of a quantity of symbols) of the starting symbols of the two time domain resources.

In some possible implementations, the first parameter associated with the $i^{th}$ time domain resource in the first time domain resource set is at least one of a reference symbol indication parameter associated with the $i^{th}$ time domain resource, a parameter for a scheduling-delay between a downlink control channel and a data channel, a starting symbol of the $i^{th}$ time domain resource, a length of the $i^{th}$ time domain resource, or a mapping type corresponding to the $i^{th}$ time domain resource. The reference symbol indication parameter associated with the $i^{th}$ time domain resource indicates that a value of the $i^{th}$ reference symbol is a first value or a second value. Optionally, any row in a first time domain resource allocation table includes the reference symbol indication parameter. Alternatively, when a scheduling-delay that is between the control channel and the data channel and that is associated with the $i^{th}$ time domain resource is greater than 0, the value of the $i^{th}$ reference symbol is the first value; or when a scheduling-delay that is between the downlink control channel and the data channel and that is associated with the $i^{th}$ time domain resource is equal to 0, the value of the $i^{th}$ reference symbol is the second value. Optionally, when the $i^{th}$ time domain resource is associated with one scheduling-delay parameter, the value of the $i^{th}$ reference symbol is the first value; or when the $i^{th}$ time domain resource is not associated with the scheduling-delay parameter, the value of the $i^{th}$ reference symbol is the second value. Alternatively, when a time domain length of the $i^{th}$ time domain resource does not belong to a first length set, the value of the $i^{th}$ reference symbol is the first value; or when a time domain length of the $i^{th}$ time domain resource belongs to a first length set, the value of the $i^{th}$ reference symbol is the second value, where the first length set is predefined or is configured by a higher layer parameter, and the first length set is optionally {2, 4}, {2, 7}, or {2, 4, 7}. Alternatively, when the starting symbol of the $i^{th}$ time domain resource is greater than a first threshold, the value of the $i^{th}$ reference symbol is the first value; or when the starting symbol of the $i^{th}$ time domain resource is less than or equal to a first threshold, the value of the $i^{th}$ reference symbol is the second value, where the first threshold is predefined or is configured by a higher layer parameter, and the first threshold is optionally 6 or 3. Alternatively, when the mapping type associated with the $i^{th}$ time domain resource is a first type, the value of the $i^{th}$ reference symbol is the first value; or when the mapping type associated with the $i^{th}$ time domain resource is a second type, the value of the $i^{th}$ reference symbol is the second value, where the first type and the second type are predefined or are configured by higher layer parameters. Optionally, the first type indicates that a demodulation reference signal of the data channel is located in the third symbol or the fourth symbol of a slot in which the data channel is located; and the second type indicates that a demodulation reference signal of the data channel is located in the $1^{st}$ symbol of a time domain resource in which the data channel is located. The first value is a symbol 0, the second value is a starting symbol of the receiving position of the first DCI or a sum of an ending symbol of the receiving position of the first DCI and a first offset, and the first offset is predefined or is configured by a higher layer parameter.

Optionally, that the first value is a symbol 0 means that a first reference symbol is the $1^{st}$ symbol of the slot in which the first DCI is located, namely, the symbol 0.

In some possible implementations, K is equal to M, and the K second-type time domain resources are the M first-type time domain resources. Alternatively, K is less than or equal to M, and the K second-type time domain resources are K time domain resources that are in the M first-type time domain resources and whose corresponding reference symbols are the second values.

In some possible implementations, the method further includes: determining the K third-type time domain resources based on the K second-type time domain resources, where a starting symbol and an ending symbol of a $j^{th}$ second-type time domain resource belong to one slot, and a $j^{th}$ third-type time domain resource is the $j^{th}$ second-type time domain resource, where j is a positive integer, and j is less than or equal to K.

In some possible implementations, the method further includes: determining the K third-type time domain resources based on the K second-type time domain resources. When a starting symbol and an ending symbol of a $j^{th}$ second-type time domain resource do not belong to one slot, a $j^{th}$ third-type time domain resource is empty; and/or when the starting symbol and the ending symbol of the $j^{th}$ second-type time domain resource do not belong to one slot, a starting symbol of the $j^{th}$ third-type time domain resource is the starting symbol of the $j^{th}$ second-type time domain resource, and an ending symbol of the $j^{th}$ third-type time domain resource is an ending symbol of a slot in which the starting symbol of the $j^{th}$ second-type time domain resource is located; and/or when the starting symbol and the ending symbol of the $j^{th}$ second-type time domain resource do not belong to one slot, the starting symbol of the $j^{th}$ third-type time domain resource is the $1^{st}$ symbol of a slot next to a slot in which the starting symbol of the $j^{th}$ second-type time domain resource is located, and a length of the $j^{th}$ third-type time domain resource is equal to a length of the $j^{th}$ second-type time domain resource.

In some possible implementations, the method further includes: determining a first downlink data transmission resource set based on the second time domain resource set, where a quantity of downlink data transmission occasions included in the first downlink data transmission resource set is equal to a maximum quantity of non-overlapping time domain resources included in the second time domain resource set; determining a second downlink data transmission resource set, where the second downlink data transmission resource set is a union set of at least one first downlink data transmission resource set, and the at least one first downlink data transmission resource set is determined based on at least one second time domain resource set corresponding to the at least one receiving position that is in the same slot; generating a first codebook, where the first codebook is corresponding to feedback information of all downlink data transmission resources in the second downlink data transmission resource set; and sending the first codebook in a first uplink time unit, where the first uplink time unit is an uplink slot or sub-slot, the first uplink time unit is determined based on second information, and the first DCI includes the second information.

Optionally, the maximum quantity of non-overlapping time domain resources included in the second time domain resource set means that K1 time domain resources are selected from the second time domain resource set, and any two of the K1 time domain resources do not overlap. The maximum quantity of non-overlapping time domain resources is equal to a maximum value of K1 that can be found.

Optionally, before the maximum quantity of non-overlapping time domain resources included in the second time domain resource set is determined, a new second time domain resource set is obtained after each time domain resource in the second time domain resource set is translated to one slot, and a maximum quantity of non-overlapping time domain resources included in the new second time domain resource set is determined.

For example, for a second time domain resource in the second time domain resource set, if a starting symbol number S is greater than or equal to n*A and less than (n+1)*A, where A is a quantity (for example, 14) of symbols in one slot, a starting symbol S' of a time domain resource obtained after the second time domain resource is translated is S−n*A.

Optionally, the terminal device determines a first uplink control channel resource based on a size of the first codebook, and sends the first codebook on the first uplink control channel resource in the first uplink time unit.

In some possible implementations, the method further includes: determining a third time domain resource set, where the third time domain resource set is a union set of at least one second time domain resource set corresponding to the at least one receiving position that is in the same slot; determining a third downlink data transmission resource set, where a quantity of downlink data transmission resources included in the third downlink data transmission resource set is equal to a maximum quantity of non-overlapping time domain resources included in the third time domain resource set; generating a second codebook, where the second codebook is corresponding to feedback information of all downlink data transmission resources in the third downlink data transmission resource set; and sending the second codebook in a second uplink time unit, where the second uplink time unit is an uplink slot or sub-slot, the second uplink time unit is determined based on third information, and the first DCI includes the third information.

Similarly, the maximum quantity of non-overlapping time domain resources included in the third time domain resource set means that K2 time domain resources are selected from the third time domain resource set, and any two of the K2 time domain resources do not overlap. The maximum quantity of non-overlapping time domain resources is equal to a maximum value of K2 that can be found.

Optionally, before the maximum quantity of non-overlapping time domain resources included in the third time domain resource set is determined, a new third time domain resource set is obtained after each time domain resource in the third time domain resource set is translated to one slot, and a maximum quantity of non-overlapping time domain resources included in the new third time domain resource set is determined. For a third time domain resource in the third time domain resource set, if a starting symbol S is greater than or equal to n*A and less than (n+1)*A, where A is a quantity of symbols in one slot, a starting symbol S' of a time domain resource obtained after the third time domain resource is translated is S−n*A.

Optionally, the terminal device determines a second uplink control channel resource based on a size of the second codebook, and sends the second codebook on the second uplink control channel resource in the second uplink time unit.

In some possible implementations, the first DCI is used to schedule ultra-reliable low-latency communication URLLC data; the first DCI is DCI in a first format, where a payload of the DCI in the first format is the smallest in payloads of all formats of DCI for scheduling data transmission; a radio network temporary identifier RNTI of the first DCI is a first RNTI, where the first RNTI is an RNTI other than a cell radio network temporary identifier C-RNTI or a configured scheduling radio network temporary identifier CS-RNTI, for example, a MCS-C-RNTI; a search space in which the first DCI is located belongs to a first search space, where the first search space is predefined or is configured by a higher layer parameter; a control resource set in which the first DCI is located belongs to a first control resource set, where the first control resource set is predefined or is configured by a higher layer parameter; or a value of a first bit field in the first DCI is a first value, where the first bit field is used to indicate a priority or service type of data scheduled by the DCI.

Optionally, the at least one receiving position in one slot is a receiving position used to receive DCI for scheduling ultra-reliable low-latency data transmission. That is, the at least one receiving position in one slot is a time domain position used to transmit the first DCI.

Optionally, the first time domain resource set or the first time domain resource allocation table associated with the first time domain resource set is used to schedule ultra-reliable low-latency data transmission. To be specific, the first time domain resource allocation table is corresponding to the first DCI, and a width of a time domain resource allocation bit field in the first DCI is corresponding to a quantity of rows included in the first time domain resource allocation table.

According to a fourth aspect, a communication method is provided. The method includes: sending first DCI at a first receiving position in at least one receiving position, where the first DCI includes first information, the first information is used to indicate time domain resource allocation, and the at least one receiving position is located in a same slot; and transmitting a data channel on a second time domain resource, where the second time domain resource is determined based on the first information and a second time domain resource set, and the second time domain resource set is determined based on the first receiving position and a first time domain resource set, where the first time domain resource set includes M time domain resources, the first time domain resource set is predefined or is configured by a higher layer parameter, and M is a positive integer greater than or equal to 2.

According to the method in this embodiment of this application, the second time domain resource set is determined based on the first receiving position and the first time domain resource set, the second time domain resource is determined in the second time domain resource set based on the first information, and the data channel is transmitted on the second time domain resource. Because the second time domain resource is associated with the receiving position, flexibility and reliability of data transmission can be improved.

Optionally, descriptions of the receiving position, the first time domain resource set, and the time domain resource are the same as those in the first aspect, and details are not described herein again.

In some possible implementations, the method further includes: determining M first-type time domain resources, where a difference between a starting symbol of an $i^{th}$ time domain resource in the M first-type time domain resources and an $i^{th}$ reference symbol is equal to a starting symbol of an $i^{th}$ time domain resource in the first time domain resource set, and a length of the $i^{th}$ time domain resource in the M first-type time domain resources is equal to a length of the $i^{th}$ time domain resource in the first time domain resource set, where i is a positive integer less than or equal to M, and the $i^{th}$ reference symbol is determined by a first parameter associated with the $i^{th}$ time domain resource in the first time domain resource set; and determining K second-type time domain resources based on the M first-type time domain resources, and determining K third-type time domain resources based on the K second-type time domain resources, where the second time domain resource set includes the K third-type time domain resources, and K is a positive integer less than or equal to M.

Optionally, a difference between starting symbols of two time domain resources is equivalent to a difference between numbers of the starting symbols of the two time domain resources, or is equivalent to a distance (where the distance is in a unit of a quantity of symbols) of the starting symbols of the two time domain resources.

In some possible implementations, the first parameter associated with the $i^{th}$ time domain resource in the first time domain resource set is at least one of a reference symbol indication parameter associated with the $i^{th}$ time domain resource, a scheduling-delay parameter between a downlink control channel and a data channel, a starting symbol of the $i^{th}$ time domain resource, a length of the $i^{th}$ time domain resource, or a mapping type corresponding to the $i^{th}$ time domain resource. The reference symbol indication parameter associated with the $i^{th}$ time domain resource indicates that a value of the $i^{th}$ reference symbol is a first value or a second value. Optionally, any row in a first time domain resource allocation table includes the reference symbol indication parameter. Alternatively, when a scheduling-delay that is between the control channel and the data channel and that is associated with the $i^{th}$ time domain resource is greater than 0, the value of the $i^{th}$ reference symbol is the first value; or when a scheduling-delay that is between the downlink control channel and the data channel and that is associated with the $i^{th}$ time domain resource is equal to 0, the value of the $i^{th}$ reference symbol is the second value. Optionally, when the $i^{th}$ time domain resource is associated with one scheduling-delay parameter, the value of the $i^{th}$ reference symbol is the first value; or when the $i^{th}$ time domain resource is not associated with the scheduling-delay parameter, the value of the $i^{th}$ reference symbol is the second value. Alternatively, when a time domain length of the $i^{th}$ time domain resource does not belong to a first length set, the value of the $i^{th}$ reference symbol is the first value; or when a time domain length of the $i^{th}$ time domain resource belongs to a first length set, the value of the $i^{th}$ reference symbol is the second value, where the first length set is predefined or is configured by a higher layer parameter, and a first set is optionally {2, 4}, {2, 7}, or {2, 4, 7}. Alternatively, when the starting symbol of the $i^{th}$ time domain resource is greater than a first threshold, the value of the $i^{th}$ reference symbol is the first value; or when the starting symbol of the $i^{th}$ time domain resource is less than or equal to a first threshold, the value of the $i^{th}$ reference symbol is the second value, where the first threshold is predefined or is configured by a higher layer parameter, and the first threshold is optionally 6 or 3. Alternatively, when the mapping type associated with the $i^{th}$ time domain resource is a first type, the value of the $i^{th}$ reference symbol is the first value; or when the mapping type associated with the $i^{th}$ time domain resource is a second type, the value of the $i^{th}$ reference symbol is the second value, where the first type and the second type are predefined or are configured by higher layer parameters. Optionally, the first type indicates that a demodulation reference signal of the data channel is located in the third symbol or the fourth symbol of a slot in which the data channel is located; and the second type indicates that a demodulation reference signal of the data channel is located in the $1^{st}$ symbol of a time domain resource in which the data channel is located. The first value is a symbol 0, the second value is a starting symbol of the receiving position of the first DCI or a sum of an ending symbol of the receiving position of the first DCI and a first offset, and the first offset is predefined or is configured by a higher layer parameter.

Optionally, that the first value is a symbol 0 means that a first reference symbol is the $1^{st}$ symbol of the slot in which the first DCI is located, namely, the symbol 0.

In some possible implementations, K is equal to M, and the K second-type time domain resources are the M first-type time domain resources. Alternatively, K is less than or equal to M, and the K second-type time domain resources are K time domain resources that are in the M first-type time domain resources and whose corresponding reference symbols are the second values.

In some possible implementations, the method further includes: determining the K third-type time domain resources based on the K second-type time domain resources, where a starting symbol and an ending symbol of a $j^{th}$ second-type time domain resource belong to one slot, and a $j^{th}$ third-type time domain resource is the $j^{th}$ second-type time domain resource, where j is a positive integer, and j is less than or equal to K.

In some possible implementations, the method further includes: determining the K third-type time domain resources based on the K second-type time domain resources. When a starting symbol and an ending symbol of a $j^{th}$ second-type time domain resource do not belong to one slot, a $j^{th}$ third-type time domain resource is empty; and/or when the starting symbol and the ending symbol of the $j^{th}$ second-type time domain resource do not belong to one slot, a starting symbol of the $j^{th}$ third-type time domain resource is the starting symbol of the $j^{th}$ second-type time domain resource, and an ending symbol of the $j^{th}$ third-type time domain resource is an ending symbol of a slot in which the starting symbol of the $j^{th}$ second-type time domain resource is located; and/or when the starting symbol and the ending symbol of the $j^{th}$ second-type time domain resource do not belong to one slot, the starting symbol of the $j^{th}$ third-type time domain resource is the $1^{st}$ symbol of a slot next to a slot in which the starting symbol of the $j^{th}$ second-type time domain resource is located, and a length of the $j^{th}$ third-type time domain resource is equal to a length of the $j^{th}$ second-type time domain resource.

In some possible implementations, the method further includes: determining a first downlink data transmission resource set based on the first time domain resource set, where a quantity of downlink data transmission resources included in the first downlink data transmission resource set is equal to a maximum quantity of non-overlapping time domain resources included in the first time domain resource set, the first time domain resource set includes a plurality of time domain resources, and the first time domain resource set is predefined or is configured by a higher layer parameter; determining a second downlink data transmission resource set, where the second downlink data transmission resource set is a union set of a plurality of first downlink data transmission resource sets, and the plurality of first downlink data transmission resource sets are determined based on a plurality of first time domain resource sets corresponding to the plurality of receiving positions in a same slot; and receiving a first codebook, where the first codebook is corresponding to feedback information of all downlink data transmission resources in the second downlink data transmission occasion set.

Optionally, the maximum quantity of non-overlapping time domain resources included in the first time domain resource set means that K1 time domain resources are selected from the first time domain resource set, and any two of the K1 time domain resources do not overlap. The maximum quantity of non-overlapping time domain resources is equal to a maximum value of K1 that can be found.

Optionally, before the maximum quantity of non-overlapping time domain resources included in the first time domain resource set is determined, a new first time domain resource set is obtained after each time domain resource in the first time domain resource set is translated to one slot, and a maximum quantity of non-overlapping time domain resources included in the new first time domain resource set is determined.

For example, for a first time domain resource in the first time domain resource set, if a starting symbol number S is greater than or equal to n*A and less than (n+1)*A, where A is a quantity (for example, 14) of symbols in one slot, a starting symbol S' of a time domain resource obtained after the first time domain resource is translated is S−n*A.

Optionally, a terminal device determines a first uplink control channel resource based on a size of the first codebook, and sends the first codebook on the first uplink control channel resource in a first uplink time unit.

In some possible implementations, the method further includes: determining a third time domain resource set, where the third time domain resource set is a union set of a plurality of first time domain resource sets corresponding to the plurality of receiving positions in a same slot, the first time domain resource set includes a plurality of time domain resources, and the first time domain resource set is predefined or is configured by a higher layer parameter; determining a third downlink data transmission resource set, where a quantity of downlink data transmission resources included in the third downlink data transmission resource set is equal to a maximum quantity of non-overlapping time domain resources included in the third time domain resource set; and receiving a second codebook, where the second codebook is corresponding to feedback information of all downlink data transmission resources in the third downlink data transmission occasion set.

Similarly, the maximum quantity of non-overlapping time domain resources included in the third time domain resource set means that K2 time domain resources are selected from the third time domain resource set, and any two of the K2 time domain resources do not overlap. The maximum quantity of non-overlapping time domain resources is equal to a maximum value of K2 that can be found.

Optionally, before the maximum quantity of non-overlapping time domain resources included in the third time domain resource set is determined, a new third time domain resource set is obtained after each time domain resource in the third time domain resource set is translated to one slot, and a maximum quantity of non-overlapping time domain resources included in the new third time domain resource set is determined. For a third time domain resource in the third time domain resource set, if a starting symbol S is greater than or equal to n*A and less than (n+1)*A, where A is a quantity of symbols in one slot, a starting symbol S' of a time domain resource obtained after the third time domain resource is translated is S−n*A.

Optionally, the terminal device determines a second uplink control channel resource based on a size of the second codebook, and sends the second codebook on the second uplink control channel resource in the second uplink time unit.

In some possible implementations, the method further includes: the first DCI is used to schedule ultra-reliable low-latency communication URLLC data; the first DCI is DCI in a first format, where a payload of the DCI in the first format is the smallest in payloads of all formats of DCI for scheduling data transmission; a radio network temporary identifier RNTI of the first DCI is a first RNTI, where the first RNTI is an RNTI other than a cell radio network temporary identifier C-RNTI or a configured scheduling radio network temporary identifier CS-RNTI, for example, a MCS-C-RNTI; a search space in which the first DCI is located belongs to a first search space, where the first search space is predefined or is configured by a higher layer parameter; a control resource set in which the first DCI is located belongs to a first control resource set, where the first control resource set is predefined or is configured by a higher layer parameter; or a value of a first bit field in the first DCI is a first value, where the first bit field is used to indicate a priority or service type of data scheduled by the DCI.

Optionally, the at least one receiving position in one slot is a receiving position used to receive DCI for scheduling ultra-reliable low-latency data transmission. That is, the at least one receiving position in one slot is a time domain position used to transmit the first DCI.

Optionally, the first time domain resource set or the first time domain resource allocation table associated with the first time domain resource set is used to schedule ultra-reliable low-latency data transmission. To be specific, the first time domain resource allocation table is corresponding to the first DCI, and a width of a time domain resource allocation bit field in the first DCI is corresponding to a quantity of rows included in the first time domain resource allocation table.

According to a fifth aspect, a communication method is provided. The method includes: receiving first DCI at a first receiving position in at least one receiving position, where the first DCI includes first information, the first information is used to indicate time domain resource allocation, and the at least one receiving position is located in a same slot; determining, based on the first receiving position, a first time domain resource set corresponding to the first receiving position, where the first time domain resource set is one of at least one time domain resource set configured by a higher layer or predefined; determining a first time domain resource based on the first information and the first time domain resource set, where the first time domain resource is one of a plurality of time domain resources included in the first time domain resource set; and transmitting a data channel on the first time domain resource.

According to the method in this embodiment of this application, the first time domain resource set corresponding to the first receiving position is determined based on the first receiving position, the first time domain resource is determined in the first time domain resource set based on the first information, and the data channel is transmitted on the first time domain resource. Because the first time domain resource is associated with the receiving position, flexibility and reliability of data transmission can be improved.

Optionally, descriptions of the receiving position are the same as those in the first aspect, and details are not described herein again.

Optionally, the at least one first time domain resource set is determined by at least one first time domain resource allocation table, an $i^{th}$ first time domain resource allocation table in the at least one first time domain resource allocation table includes Mi rows, and each row is corresponding to one time domain resource. Optionally, downlink transmission and uplink transmission each are associated with one first time domain resource allocation table and corresponding to one first time domain resource set.

Optionally, all first time domain resource allocation tables in the at least one first time domain resource allocation table include a same quantity of rows. Optionally, different first time domain resource allocation tables in the at least one first time domain resource allocation table include different quantities of rows.

Optionally, descriptions of one first time domain resource allocation table in the at least one first time domain resource allocation table are the same as those in the first aspect, and details are not described herein again.

Optionally, descriptions of the time domain resource are the same as those in the first aspect, and details are not described herein again.

In some possible implementations, the method further includes: for one of the at least one time domain resource set, determining a first downlink data transmission occasion set, and a quantity of downlink data transmission occasions included in the first downlink data transmission occasion set is equal to a maximum quantity of non-overlapping time domain positions included in the time domain resource set; determining a second downlink data transmission occasion set, where the second downlink data transmission occasion set is a union set of at least one first downlink data transmission occasion set, and the at least one first downlink data transmission occasion set is determined based on the at least one time domain resource set; generating a first codebook, where the first codebook is corresponding to feedback information of all downlink data transmission resources in the second downlink data transmission resource set; and sending the first codebook in a first uplink time unit, where the first uplink time unit is an uplink slot or sub-slot, the first uplink time unit is determined based on second information, and the first DCI includes the second information.

Optionally, the maximum quantity of non-overlapping time domain resources included in the time domain resource set means that K1 time domain resources are selected from the time domain resource set, and any two of the K1 time domain resources do not overlap. The maximum quantity of non-overlapping time domain resources is equal to a maximum value of K1 that can be found.

Optionally, before the maximum quantity of non-overlapping time domain resources included in the time domain resource set is determined, a new time domain resource set is obtained after each time domain resource in the time domain resource set is translated to one slot, and a maximum quantity of non-overlapping time domain resources included in the new time domain resource set is determined.

For example, for a time domain resource in the time domain resource set, if a starting symbol S is greater than or equal to n*A and less than (n+1)*A, where A is a quantity of symbols in one slot, a starting symbol S' of a time domain resource obtained after the time domain resource is translated is S−n*A.

Optionally, the terminal device determines a first uplink control channel resource based on a size of the first codebook, and sends the first codebook on the first uplink control channel resource in the first uplink time unit.

In some possible implementations, the method further includes: determining a second time domain resource set, where the second time domain resource set is a union set of the at least one time domain resource set; determining a third downlink data transmission occasion set, where a quantity of downlink data transmission occasions included in the third downlink data transmission occasion set is equal to a maximum quantity of non-overlapping time domain resources included in the second time domain resource set; generating a second codebook, where the second codebook is corresponding to feedback information of all downlink data transmission resources in the third downlink data transmission resource set; and sending the second codebook in a second uplink time unit, where the second uplink time unit is an uplink slot or sub-slot, the second uplink time unit is determined based on third information, and the first DCI includes the third information.

Optionally, the maximum quantity of non-overlapping time domain resources included in the second time domain resource set means that K1 time domain resources are selected from the second time domain resource set, and any two of the K1 time domain resources do not overlap. The maximum quantity of non-overlapping time domain resources is equal to a maximum value of K1 that can be found.

Optionally, before the maximum quantity of non-overlapping time domain resources included in the second time domain resource set is determined, a new second time domain resource set is obtained after each time domain resource in the second time domain resource set is translated to one slot, and a maximum quantity of non-overlapping time domain resources included in the new second time domain resource set is determined. For example, for a second time domain resource in the second time domain resource set, if a starting symbol S is greater than or equal to n*A and less than (n+1)*A, where A is a quantity of symbols in one slot, a starting symbol S' of a time domain resource obtained after the second time domain resource is translated is S−n*A.

Optionally, the terminal device determines a second uplink control channel resource based on a size of the second codebook, and sends the second codebook on the second uplink control channel resource in the second uplink time unit.

In some possible implementations, the method further includes: the first DCI is used to schedule ultra-reliable low-latency communication URLLC data; the first DCI is DCI in a first format, where a payload of the DCI in the first format is the smallest in payloads of all formats of DCI for scheduling data transmission; a radio network temporary identifier RNTI of the first DCI is a first RNTI, where the first RNTI is an RNTI other than a cell radio network temporary identifier C-RNTI or a configured scheduling radio network temporary identifier CS-RNTI, for example, a MCS-C-RNTI; a search space in which the first DCI is located belongs to a first search space, where the first search space is predefined or is configured by a higher layer parameter; a control resource set in which the first DCI is located belongs to a first control resource set, where the first control resource set is predefined or is configured by a higher layer parameter; or a value of a first bit field in the first DCI is a first value, where the first bit field is used to indicate a priority or service type of data scheduled by the DCI.

Optionally, the at least one receiving position in one slot is a receiving position used to receive DCI for scheduling ultra-reliable low-latency data transmission. That is, the at least one receiving position in one slot is a time domain position used to transmit the first DCI.

Optionally, the first time domain resource set or the first time domain resource allocation table associated with the first time domain resource set is used to schedule ultra-reliable low-latency data transmission. To be specific, the first time domain resource allocation table is corresponding to the first DCI, and a width of a time domain resource allocation bit field in the first DCI is corresponding to a quantity of rows included in the first time domain resource allocation table.

According to a sixth aspect, a communication method is provided. The method includes: sending first DCI at a first receiving position in at least one receiving position, where the first DCI includes first information, the first information is used to indicate time domain resource allocation, and the at least one receiving position is located in a same slot; and transmitting a data channel on a first time domain resource, where the first time domain resource is determined based on the first information and a first time domain resource set, and the first time domain resource set is one of at least one first time domain resource set configured by a higher layer or predefined.

According to the method in this embodiment of this application, the first time domain resource set corresponding to the first receiving position is determined based on the first receiving position, the first time domain resource is determined in the first time domain resource set based on the first information, and the data channel is transmitted on the first time domain resource. Because the first time domain resource is associated with the receiving position, flexibility and reliability of data transmission can be improved.

Optionally, descriptions of the receiving position are the same as those in the first aspect, and details are not described herein again.

Optionally, the at least one first time domain resource set is determined by at least one first time domain resource allocation table, an $i^{th}$ first time domain resource allocation table in the at least one first time domain resource allocation table includes Mi rows, and each row is corresponding to one time domain resource. Optionally, downlink transmission and uplink transmission each are associated with one first time domain resource allocation table and corresponding to one first time domain resource set.

Optionally, all first time domain resource allocation tables in the at least one first time domain resource allocation table include a same quantity of rows. Optionally, different first time domain resource allocation tables in the at least one first time domain resource allocation table include different quantities of rows.

Optionally, descriptions of one first time domain resource allocation table in the at least one first time domain resource allocation table are the same as those in the first aspect, and details are not described herein again.

Optionally, descriptions of the time domain resource are the same as those in the first aspect, and details are not described herein again.

In some possible implementations, the method further includes: for one of the at least one first time domain resource set, determining a first downlink data transmission occasion set, and a quantity of downlink data transmission occasions included in the first downlink data transmission occasion set is equal to a maximum quantity of non-overlapping time domain positions included in the time domain resource set; determining a second downlink data transmission occasion set, where the second downlink data transmission occasion set is a union set of at least one first downlink data transmission occasion set, and the at least one first downlink data transmission occasion set is determined based on the at least one first time domain resource set; and receiving a first codebook, where the first codebook is corresponding to feedback information of all downlink data transmission resources in the second downlink data transmission resource set.

Optionally, the maximum quantity of non-overlapping time domain resources included in the time domain resource set means that K1 time domain resources are selected from the time domain resource set, and any two of the K1 time domain resources do not overlap. The maximum quantity of non-overlapping time domain resources is equal to a maximum value of K1 that can be found.

Optionally, before the maximum quantity of non-overlapping time domain resources included in the time domain resource set is determined, a new time domain resource set is obtained after each time domain resource in the time domain resource set is translated to one slot, and a maximum quantity of non-overlapping time domain resources included in the new time domain resource set is determined.

For example, for a time domain resource in the time domain resource set, if a starting symbol S is greater than or equal to n*A and less than (n+1)*A, where A is a quantity of symbols in one slot, a starting symbol S' of a time domain resource obtained after the time domain resource is translated is S−n*A.

Optionally, a terminal device determines a first uplink control channel resource based on a size of the first codebook, and sends the first codebook on the first uplink control channel resource in a first uplink time unit.

In some possible implementations, the method further includes: determining a second time domain resource set, where the second time domain resource set is a union set of the at least one time domain resource set; determining a third downlink data transmission occasion set, where a quantity of downlink data transmission occasions included in the third downlink data transmission occasion set is equal to a maximum quantity of non-overlapping time domain resources included in the second time domain resource set; receiving a second codebook, where the second codebook is corresponding to feedback information of all downlink data transmission resources in the third downlink data transmission resource set.

Optionally, the maximum quantity of non-overlapping time domain resources included in the second time domain resource set means that K1 time domain resources are selected from the second time domain resource set, and any two of the K1 time domain resources do not overlap. The maximum quantity of non-overlapping time domain resources is equal to a maximum value of K1 that can be found.

Optionally, before the maximum quantity of non-overlapping time domain resources included in the second time domain resource set is determined, a new second time domain resource set is obtained after each time domain resource in the second time domain resource set is translated to one slot, and a maximum quantity of non-overlapping time domain resources included in the new second time domain resource set is determined. For example, for a second time domain resource in the second time domain resource set, if a starting symbol S is greater than or equal to n*A and less than (n+1)*A, where A is a quantity of symbols in one slot, a starting symbol S' of a time domain resource obtained after the second time domain resource is translated is S−n*A.

Optionally, the terminal device determines a second uplink control channel resource based on a size of the second codebook, and sends the second codebook on the second uplink control channel resource in the second uplink time unit.

In some possible implementations, the method further includes: the first DCI is used to schedule ultra-reliable low-latency communication URLLC data; the first DCI is DCI in a first format, where a payload of the DCI in the first format is the smallest in payloads of all formats of DCI for scheduling data transmission; a radio network temporary identifier RNTI of the first DCI is a first RNTI, where the first RNTI is an RNTI other than a cell radio network temporary identifier C-RNTI or a configured scheduling radio network temporary identifier CS-RNTI, for example, a MCS-C-RNTI; a search space in which the first DCI is located belongs to a first search space, where the first search space is predefined or is configured by a higher layer parameter; a control resource set in which the first DCI is located belongs to a first control resource set, where the first control resource set is predefined or is configured by a higher layer parameter; or a value of a first bit field in the first DCI is a first value, where the first bit field is used to indicate a priority or service type of data scheduled by the DCI.

Optionally, the at least one receiving position in one slot is a receiving position used to receive DCI for scheduling ultra-reliable low-latency data transmission. That is, the at least one receiving position in one slot is a time domain position used to transmit the first DCI.

Optionally, the first time domain resource set or the first time domain resource allocation table associated with the first time domain resource set is used to schedule ultra-reliable low-latency data transmission. To be specific, the first time domain resource allocation table is corresponding to the first DCI, and a width of a time domain resource allocation bit field in the first DCI is corresponding to a quantity of rows included in the first time domain resource allocation table.

According to a seventh aspect, a communication method is provided. The method includes: receiving first DCI at a first receiving position in at least one receiving position, where the first DCI includes first information, the first information is used to indicate time domain resource allocation, and the at least one receiving position is located in a same slot; determining a second time domain resource set based on the first receiving position and a first time domain resource set, where the first time domain resource set includes a plurality of time domain resources, the first time domain resource set is predefined or is configured by a higher layer parameter; determining a second time domain resource based on the first information and the second time domain resource set, where the second time domain resource is one of a plurality of time domain resources included in the second time domain resource set; and transmitting a data channel on the second time domain resource.

According to the method in this embodiment of this application, the second time domain resource set is determined based on the first receiving position and the first time domain resource set, the second time domain resource is determined in the second time domain resource set based on the first information, and the data channel is transmitted on the second time domain resource. Because the second time domain resource is associated with the receiving position, flexibility and reliability of data transmission can be improved.

Optionally, descriptions of the receiving position and the first time domain resource set are the same as those in the first aspect, and details are not described herein again.

In some possible implementations, a time domain resource in the first time domain resource set is associated with a first parameter, where the first parameter indicates one of the at least one receiving position; and the determining a second time domain resource set based on the first receiving position and a first time domain resource set includes: the second time domain resource set includes the first time domain resource, the first time domain resource belongs to the first time domain resource set, and a receiving position indicated by the first parameter corresponding to the first time domain resource is the first receiving position.

Optionally, a row in a first time domain resource allocation table corresponding to the first time domain resource set is associated with the first parameter.

In some possible implementations, the determining a second time domain resource set based on the first receiving position and a first time domain resource set includes: the second time domain resource set includes a first time domain resource, where the first time domain resource belongs to the first time domain resource set, and the first time domain resource is one of earliest K time domain resources whose starting symbols are not earlier than a first reference symbol; or the second time domain resource set includes a third time domain resource, where the third time domain resource belongs to the first time domain resource set, the second time domain resource is one of earliest K time domain resources whose starting symbols are not earlier than the first reference symbol and that do not belong to a third time domain resource set, the third time domain resource set is determined based on a receiving position of second DCI, and the receiving position of the second DCI is earlier than the receiving position of the first DCI. K is predefined or is configured by a higher layer parameter, the first reference symbol is a starting symbol of the first receiving position, or the first reference symbol is a sum of an ending symbol of the first receiving position and a first offset, and the first offset is predefined or is configured by a higher layer parameter.

In some possible implementations, the method further includes: determining a first downlink data transmission occasion set based on the second time domain resource set, where a quantity of downlink data transmission occasions included in the first downlink data transmission occasion set is equal to a maximum quantity of non-overlapping time domain resources included in the second time domain resource set; determining a second downlink data transmission occasion set, where the second downlink data transmission occasion set is a union set of at least one first downlink data transmission occasion set, and the at least one first downlink data transmission occasion set is determined based on at least one second time domain resource set corresponding to the at least one receiving position that is in the same slot; generating a first codebook, where the first codebook is corresponding to feedback information of all downlink data transmission occasions in the second downlink data transmission occasion set; and sending the first codebook in a first uplink time unit, where the first uplink time unit is an uplink slot or sub-slot, the first uplink time unit is determined based on second information, and the first DCI includes the second information.

Optionally, the maximum quantity of non-overlapping time domain resources included in the second time domain resource set means that K1 time domain resources are selected from the second time domain resource set, and any two of the K1 time domain resources do not overlap. The maximum quantity of non-overlapping time domain resources is equal to a maximum value of K1 that can be found.

Optionally, before the maximum quantity of non-overlapping time domain resources included in the second time domain resource set is determined, a new second time domain resource set is obtained after each time domain resource in the second time domain resource set is translated to one slot, and a maximum quantity of non-overlapping time domain resources included in the new second time domain resource set is determined. For example, for a second time domain resource in the second time domain resource set, if a starting symbol S is greater than or equal to n*A and less than (n+1)*A, where A is a quantity of symbols in one slot, a starting symbol S' of a time domain resource obtained after the second time domain resource is translated is S−n*A.

Optionally, a terminal device determines a first uplink control channel resource based on a size of the first codebook, and sends the first codebook on the first uplink control channel resource in the first uplink time unit.

In some possible implementations, the method further includes: determining a fourth time domain resource set, where the fourth time domain resource set is a union set of at least one second time domain resource set corresponding to the at least one receiving position that is in the same slot; determining a third downlink data transmission occasion set, where a quantity of downlink data transmission occasions included in the third downlink data transmission occasion set is equal to a maximum quantity of non-overlapping time domain resources included in the fourth time domain resource set; generating a second codebook, where the second codebook is corresponding to feedback information of all downlink data transmission occasions in the third downlink data transmission occasion set; and sending the second codebook in a second uplink time unit, where the second uplink time unit is an uplink slot or sub-slot, the second uplink time unit is determined based on third information, and the first DCI includes the third information.

Similarly, the maximum quantity of non-overlapping time domain resources included in the fourth time domain resource set means that K2 time domain resources are selected from the fourth time domain resource set, and any two of the K2 time domain resources do not overlap. The maximum quantity of non-overlapping time domain resources is equal to a maximum value of K2 that can be found.

Optionally, before the maximum quantity of non-overlapping time domain resources included in the fourth time domain resource set is determined, a new fourth time domain resource set is obtained after each time domain resource in the fourth time domain resource set is translated to one slot, and a maximum quantity of non-overlapping time domain resources included in the new fourth time domain resource set is determined. For a fourth time domain resource in the fourth time domain resource set, if a starting symbol S is greater than or equal to n*A and less than (n+1)*A, where A is a quantity of symbols in one slot, a starting symbol S' of a time domain resource obtained after the fourth time domain resource is translated is S−n*A.

Optionally, the terminal device determines a second uplink control channel resource based on a size of the second codebook, and sends the second codebook on the second uplink control channel resource in the second uplink time unit.

In some possible implementations, the method further includes: determining a fourth downlink data transmission occasion set, where a quantity of downlink data transmission occasions included in the fourth downlink data transmission occasion set is equal to a maximum quantity of non-overlapping time domain resources included in the first time domain resource set; generating a third codebook, where the third codebook is corresponding to feedback information of all downlink data transmission occasions in the fourth downlink data transmission occasion set; and sending the third codebook in a third uplink time unit, where the third uplink time unit is an uplink slot or sub-slot, the third uplink time unit is determined based on fourth information, and the first DCI includes the fourth information.

Similarly, the maximum quantity of non-overlapping time domain resources included in the first time domain resource set means that K2 time domain resources are selected from the first time domain resource set, and any two of the K2 time domain resources do not overlap. The maximum quantity of non-overlapping time domain resources is equal to a maximum value of K2 that can be found.

Optionally, before the maximum quantity of non-overlapping time domain resources included in the first time domain resource set is determined, a new first time domain resource set is obtained after each time domain resource in the first time domain resource set is translated to one slot, and a maximum quantity of non-overlapping time domain resources included in the new first time domain resource set is determined. For a first time domain resource in the first time domain resource set, if a starting symbol S is greater than or equal to n*A and less than (n+1)*A, where A is a quantity of symbols in one slot, a starting symbol S' of a time domain resource obtained after the first time domain resource is translated is S−n*A.

Optionally, the terminal device determines a third uplink control channel resource based on a size of the third codebook, and sends the third codebook on the third uplink control channel resource in the third uplink time unit.

In some possible implementations, the method further includes: the first DCI is used to schedule ultra-reliable low-latency communication URLLC data; the first DCI is DCI in a first format, where a payload of the DCI in the first format is the smallest in payloads of all formats of DCI for scheduling data transmission; a radio network temporary identifier RNTI of the first DCI is a first RNTI, where the first RNTI is an RNTI other than a cell radio network temporary identifier C-RNTI or a configured scheduling radio network temporary identifier CS-RNTI, for example, a MCS-C-RNTI; a search space in which the first DCI is located belongs to a first search space, where the first search space is predefined or is configured by a higher layer parameter; a control resource set in which the first DCI is located belongs to a first control resource set, where the first control resource set is predefined or is configured by a higher layer parameter; or a value of a first bit field in the first DCI is a first value, where the first bit field is used to indicate a priority or service type of data scheduled by the DCI.

Optionally, the at least one receiving position in one slot is a receiving position used to receive DCI for scheduling ultra-reliable low-latency data transmission. That is, the at least one receiving position in one slot is a time domain position used to transmit the first DCI.

Optionally, the first time domain resource set or the first time domain resource allocation table associated with the first time domain resource set is used to schedule ultra-reliable low-latency data transmission. To be specific, the first time domain resource allocation table is corresponding to the first DCI, and a width of a time domain resource allocation bit field in the first DCI is corresponding to a quantity of rows included in the first time domain resource allocation table.

According to an eighth aspect, a communication method is provided. The method includes: sending first DCI at a first receiving position in at least one receiving position, where the first DCI includes first information, the first information is used to indicate time domain resource allocation, and the at least one receiving position is located in a same slot; and transmitting a data channel on a second time domain resource, where the first time domain resource is determined based on the first information and a first time domain resource set, and the first time domain resource set is configured by a higher layer or predefined.

According to the method in this embodiment of this application, the second time domain resource set is determined based on the first receiving position and the first time domain resource set, the second time domain resource is determined in the second time domain resource set based on the first information, and the data channel is transmitted on the second time domain resource. Because the second time domain resource is associated with the receiving position, flexibility and reliability of data transmission can be improved.

Optionally, descriptions of the receiving position and the first time domain resource set are the same as those in the first aspect, and details are not described herein again.

In some possible implementations, a time domain resource in the first time domain resource set is associated with a first parameter, where the first parameter indicates one of the at least one receiving position; and the second time domain resource set includes the first time domain resource, the first time domain resource belongs to the first time domain resource set, and a receiving position indicated by the first parameter corresponding to the first time domain resource is the first receiving position.

Optionally, a row in a first time domain resource allocation table corresponding to the first time domain resource set is associated with the first parameter.

In some possible implementations, the second time domain resource set includes a first time domain resource, where the first time domain resource belongs to the first time domain resource set, and the first time domain resource is one of earliest K time domain resources whose starting symbols are not earlier than a first reference symbol; or the second time domain resource set includes a third time domain resource, where the third time domain resource belongs to the first time domain resource set, the second time domain resource is one of earliest K time domain resources whose starting symbols are not earlier than the first reference symbol and that do not belong to a third time domain resource set, the third time domain resource set is determined based on a receiving position of second DCI, and the receiving position of the second DCI is earlier than the receiving position of the first DCI. K is predefined or is configured by a higher layer parameter, the first reference symbol is a starting symbol of the first receiving position, or the first reference symbol is a sum of an ending symbol of the first receiving position and a first offset, and the first offset is predefined or is configured by a higher layer parameter.

In some possible implementations, the method further includes: determining a first downlink data transmission occasion set based on the second time domain resource set, where a quantity of downlink data transmission occasions included in the first downlink data transmission occasion set is equal to a maximum quantity of non-overlapping time domain resources included in the second time domain resource set; determining a second downlink data transmission occasion set, where the second downlink data transmission occasion set is a union set of at least one first downlink data transmission occasion set, and the at least one first downlink data transmission occasion set is determined based on at least one second time domain resource set corresponding to the at least one receiving position that is in the same slot; and receiving a first codebook, where the first codebook is corresponding to feedback information of all downlink data transmission occasions in the second downlink data transmission occasion set.

Optionally, the maximum quantity of non-overlapping time domain resources included in the second time domain resource set means that K1 time domain resources are selected from the second time domain resource set, and any two of the K1 time domain resources do not overlap. The maximum quantity of non-overlapping time domain resources is equal to a maximum value of K1 that can be found.

Optionally, before the maximum quantity of non-overlapping time domain resources included in the second time domain resource set is determined, a new second time domain resource set is obtained after each time domain resource in the second time domain resource set is translated to one slot, and a maximum quantity of non-overlapping time domain resources included in the new second time domain resource set is determined. For example, for a second time domain resource in the second time domain resource set, if a starting symbol S is greater than or equal to n*A and less than (n+1)*A, where A is a quantity of symbols in one slot, a starting symbol S' of a time domain resource obtained after the second time domain resource is translated is S−n*A.

Optionally, a terminal device determines a first uplink control channel resource based on a size of the first codebook, and sends the first codebook on the first uplink control channel resource in the first uplink time unit.

In some possible implementations, the method further includes: determining a fourth time domain resource set, where the fourth time domain resource set is a union set of at least one second time domain resource set corresponding to the at least one receiving position that is in the same slot; determining a third downlink data transmission occasion set, where a quantity of downlink data transmission occasions included in the third downlink data transmission occasion set is equal to a maximum quantity of non-overlapping time domain resources included in the fourth time domain resource set; and receiving a second codebook, where the second codebook is corresponding to feedback information of all downlink data transmission occasions in the third downlink data transmission occasion set.

Similarly, the maximum quantity of non-overlapping time domain resources included in the fourth time domain resource set means that K2 time domain resources are selected from the fourth time domain resource set, and any two of the K2 time domain resources do not overlap. The maximum quantity of non-overlapping time domain resources is equal to a maximum value of K2 that can be found.

Optionally, before the maximum quantity of non-overlapping time domain resources included in the fourth time domain resource set is determined, a new fourth time domain resource set is obtained after each time domain resource in the fourth time domain resource set is translated to one slot, and a maximum quantity of non-overlapping time domain resources included in the new fourth time domain resource set is determined. For a fourth time domain resource in the fourth time domain resource set, if a starting symbol S is greater than or equal to n*A and less than (n+1)*A, where A is a quantity of symbols in one slot, a starting symbol S' of a time domain resource obtained after the fourth time domain resource is translated is S−n*A.

Optionally, the terminal device determines a second uplink control channel resource based on a size of the second codebook, and sends the second codebook on the second uplink control channel resource in the second uplink time unit.

In some possible implementations, the method further includes: determining a fourth downlink data transmission occasion set, where a quantity of downlink data transmission occasions included in the fourth downlink data transmission occasion set is equal to a maximum quantity of non-overlapping time domain resources included in the first time domain resource set;

and receiving a third codebook, where the third codebook is corresponding to feedback information of all downlink data transmission occasions in the fourth downlink data transmission occasion set.

Similarly, the maximum quantity of non-overlapping time domain resources included in the first time domain resource set means that K2 time domain resources are selected from the first time domain resource set, and any two of the K2 time domain resources do not overlap. The maximum quantity of non-overlapping time domain resources is equal to a maximum value of K2 that can be found.

Optionally, before the maximum quantity of non-overlapping time domain resources included in the first time domain resource set is determined, a new first time domain resource set is obtained after each time domain resource in the first time domain resource set is translated to one slot, and a maximum quantity of non-overlapping time domain resources included in the new first time domain resource set is determined. For a first time domain resource in the first time domain resource set, if a starting symbol S is greater than or equal to n*A and less than (n+1)*A, where A is a quantity of symbols in one slot, a starting symbol S' of a time domain resource obtained after the first time domain resource is translated is S−n*A.

Optionally, the terminal device determines a third uplink control channel resource based on a size of the third codebook, and sends the third codebook on the third uplink control channel resource in the third uplink time unit.

In some possible implementations, the method further includes: the first DCI is used to schedule ultra-reliable low-latency communication URLLC data; the first DCI is DCI in a first format, where a payload of the DCI in the first format is the smallest in payloads of all formats of DCI for scheduling data transmission; a radio network temporary identifier RNTI of the first DCI is a first RNTI, where the first RNTI is an RNTI other than a cell radio network temporary identifier C-RNTI or a configured scheduling radio network temporary identifier CS-RNTI, for example, a MCS-C-RNTI; a search space in which the first DCI is located belongs to a first search space, where the first search space is predefined or is configured by a higher layer parameter; a control resource set in which the first DCI is located belongs to a first control resource set, where the first control resource set is predefined or is configured by a higher layer parameter; or a value of a first bit field in the first DCI is a first value, where the first bit field is used to indicate a priority or service type of data scheduled by the DCI.

Optionally, the at least one receiving position in one slot is a receiving position used to receive DCI for scheduling ultra-reliable low-latency data transmission. That is, the at least one receiving position in one slot is a time domain position used to transmit the first DCI.

Optionally, the first time domain resource set or the first time domain resource allocation table associated with the first time domain resource set is used to schedule ultra-reliable low-latency data transmission. To be specific, the first time domain resource allocation table is corresponding to the first DCI, and a width of a time domain resource allocation bit field in the first DCI is corresponding to a quantity of rows included in the first time domain resource allocation table.

According to a ninth aspect, a communication apparatus is provided. The communication apparatus includes a processor. The processor is coupled to a memory, and may be configured to execute instructions in the memory, to implement the method according to any one of the foregoing aspects and the possible implementations of the foregoing aspects.

Optionally, the communication apparatus further includes a communication interface, and the processor is coupled to the communication interface.

In an implementation, the communication apparatus is a terminal device. When the communication apparatus is a terminal device, the communication interface may be a transceiver or an input/output interface.

In another implementation, the communication apparatus is a chip disposed in the terminal device. When the communication apparatus is a chip disposed in the terminal device, the communication interface may be an input/output interface of the chip.

Optionally, the transceiver may be a transceiver circuit. Optionally, the input/output interface may be an input/output circuit.

In another implementation, the communication apparatus may alternatively be the terminal device in any one of the foregoing implementations, to implement steps or functions of the terminal device in any one of the foregoing implementations.

In an implementation, the communication apparatus is a network device. When the communication apparatus is a network device, the communication interface may be a transceiver or an input/output interface.

In another implementation, the communication apparatus is a chip disposed in the network device. When the communication apparatus is a chip disposed in the network device, the communication interface may be an input/output interface of the chip.

Optionally, the transceiver may be a transceiver circuit. Optionally, the input/output interface may be an input/output circuit.

In another implementation, the communication apparatus may alternatively be the network device in any one of the foregoing implementations, to implement steps or functions of the network device in any one of the foregoing implementations.

For example, the communication apparatus may include a receiving unit and a sending unit. For example, the sending unit may be a transmitter, and the receiving unit may be a receiver. In another implementation, for example, the sending unit and the receiving unit in the communication apparatus in this application may be implemented by using a same module. For example, functions of the sending unit and the receiving unit are implemented by using one transceiver circuit module. The communication apparatus may further include a processing unit, and the processing unit may be a processor. The communication apparatus may further include a storage unit, and the storage unit may be a memory. The storage unit is configured to store instructions, and the processing unit executes the instructions stored in the storage unit, to enable the communication apparatus to perform the method according to any one of the foregoing aspects and the optional implementations thereof. When the communication apparatus is a chip, the processing unit may be a processor, and the receiving unit/sending unit may be an input/output interface, a pin, a circuit, or the like. The processing unit executes instructions stored in a storage unit, to enable the communication apparatus to perform the method in any one of the foregoing aspects and the optional implementations thereof. The storage unit may be a storage unit (for example, a register or a cache) in the chip, or may be a storage unit (for example, a read-only memory or a random access memory) that is in the communication apparatus and outside the chip.

According to a tenth aspect, a processor is provided. The processor includes an input circuit, an output circuit, and a processing circuit. The processing circuit is configured to: receive a signal by using the input circuit, and transmit a signal by using the output circuit, to enable the processor to perform the method according to any one of the foregoing aspects and the possible implementations of the foregoing aspects.

In a specific implementation process, the processor may be a chip, the input circuit may be an input pin, the output circuit may be an output pin, and the processing circuit may be a transistor, a gate circuit, a trigger, various logic circuits, or the like. An input signal received by the input circuit may be received and input by, for example, but not limited to, a receiver, a signal output by the output circuit may be output to, for example, but not limited to, a transmitter and transmitted by the transmitter, and the input circuit and the output circuit may be a same circuit, where the circuit is used as the input circuit and the output circuit at different moments. Specific implementations of the processor and the various circuits are not limited in the embodiments of this application.

According to an eleventh aspect, a processing apparatus is provided. The processing apparatus includes a processor, and may further include a memory. The processor is configured to: read instructions stored in the memory, receive a signal by using a receiver, and transmit a signal by using a transmitter, to perform the method according to any one of the foregoing aspects and the possible implementations of the foregoing aspects.

Optionally, there are one or more processors, and there are one or more memories.

Optionally, the memory may be integrated into the processor, or the memory and the processor are separately disposed.

In a specific implementation process, the memory may be a non-transitory (non-transitory) memory, for example, a read-only memory (read-only memory, ROM). The memory and the processor may be integrated on a same chip, or may be separately disposed on different chips. A type of the memory and a manner of disposing the memory and the processor are not limited in the embodiments of this application.

The processing apparatus in the eleventh aspect may be a chip. The processor may be implemented by using hardware, or may be implemented by using software. When the processor is implemented by using hardware, the processor may be a logic circuit, an integrated circuit, or the like. When the processor is implemented by using software, the processor may be a general-purpose processor, and is implemented by reading software code stored in the memory. The memory may be integrated into the processor, may be located outside the processor, or may exist independently.

According to a twelfth aspect, a computer program product is provided. The computer program product includes a computer program (also referred to as code or instructions). When the computer program is run, a computer is enabled to perform the method according to any one of the foregoing aspects and the possible implementations of the foregoing aspects.

According to a thirteenth aspect, a computer-readable medium is provided. The computer-readable medium stores a computer program (also referred to as code or instructions). When the computer program is run on a computer, the computer is enabled to perform the method according to any one of the foregoing aspects and the possible implementations of the foregoing aspects.

According to a fourteenth aspect, a communication system is provided. The communication system includes a terminal and a network device, where the terminal may perform the method according to the first aspect, and the network device may perform the method according to the second aspect; the terminal may perform the method according to the third aspect, and the network device may perform the method according to the fourth aspect; the terminal may perform the method according to the fifth aspect, and the network device may perform the method according to the sixth aspect; or the terminal may perform the method according to the seventh aspect, and the network device may perform the method according to the eighth aspect.

DESCRIPTION OF EMBODIMENTS

Figure 1:
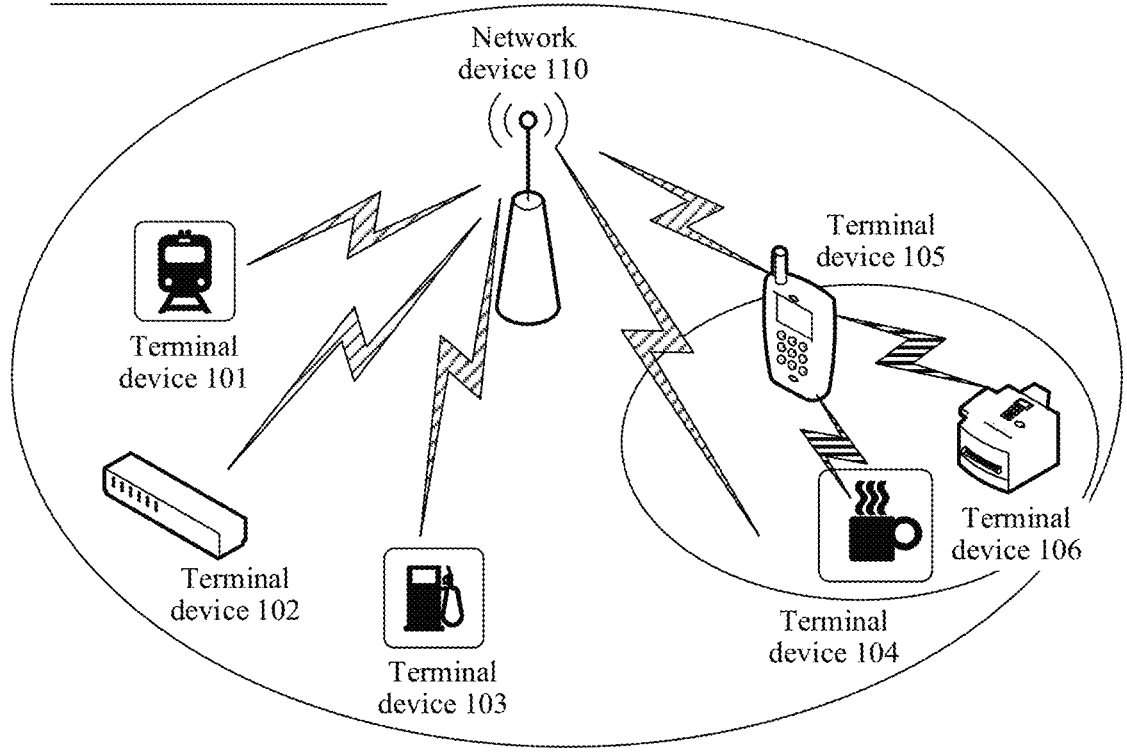
FIG. 1 is an architectural diagram of an example of a communication system to which an embodiment of this application is applicable.

The following describes technical solutions of this application with reference to the accompanying drawings.

The technical solution in embodiments of this application may be applied to various communication systems, for example, a 4th generation (4th Generation, 4G) communication system such as a long term evolution (long term evolution, LTE) system, an LTE frequency division duplex (frequency division duplex, FDD) system, or an LTE time division duplex (time division duplex, TDD) system, a 5th generation (5th generation, 5G) communication system such as a new radio (new radio, NR) system, or another new communication system such as a next generation (next generation, NG) communication system. The 5G mobile communication system in this application includes a non-standalone (non-standalone, NSA) 5G mobile communication system and/or a standalone (standalone, SA) 5G mobile communication system.

A terminal device in the embodiments of this application may be user equipment (user equipment, UE), an access terminal, a subscriber unit, a subscriber station, a mobile station, a remote station, a remote terminal, a mobile device, a user terminal, a terminal, a wireless communication device, a user agent, or a user apparatus. The terminal device may alternatively be a cellular phone, a cordless phone, a session initiation protocol (Session Initiation Protocol, SIP) phone, a wireless local loop (wireless local loop, WLL) station, a personal digital assistant (personal digital assistant, PDA), a handheld device having a wireless communication function, a computing device, another processing device connected to a wireless modem, a vehicle-mounted device, a wearable device, an unmanned aerial vehicle device, a terminal device in a 5G network, a terminal device in a future evolved public land mobile network (public land mobile network, PLMN), or the like. This is not limited in the embodiments of this application. The wearable device may also be referred to as a wearable intelligent device, and is a general term for wearable devices such as glasses, gloves, watches, clothes, and shoes that are developed by applying wearable technologies in intelligent designs of daily wear. The wearable device is a portable device that is directly worn on a body or integrated into clothes or an accessory of a user. The wearable device is not only a hardware device, but also implements a powerful function through software support, data exchange, and cloud interaction. Generalized wearable intelligent devices include full-featured and large-size devices that can implement complete or partial functions without depending on smartphones, for example, smart watches or smart glasses, and devices that focus on only one type of application function and need to work with other devices such as smartphones, for example, various smart bands or smart jewelry for monitoring physical signs.

In the embodiments of this application, the terminal device may alternatively be a terminal device in an internet of things (internet of things, IoT) system. IoT is an important part of development of future information technologies. A main technical feature of the IoT is connecting a thing to a network by using a communication technology, to implement an intelligent network for interconnection between a person and a machine or between one thing and another. In the embodiments of this application, an IoT technology may implement massive connections, deep coverage, and terminal power saving by using, for example, a narrowband (narrow band) NB technology. The terminal device may further include a sensor such as an intelligent printer, a train detector, or a gas station. Main functions of the terminal device include collecting data (some terminal devices), receiving control information and downlink data of a network device, sending an electromagnetic wave, and transmitting uplink data to the network device.

The network device in the embodiments of this application may be a device configured to communicate with the terminal device. The network device may be a base station device in the LTE system, namely, an evolved node B (evolved NodeB, eNB/eNodeB), or may be an access network side device in the NR system, including a gNB, a transmission point (transmission point, TRP), and the like. The network device may include a central unit (central unit, CU) and a distributed unit (distributed unit, DU). The CU may also be referred to as a control unit (control unit). A CU-DU structure may be used to split protocol layers of the base station. Functions of some protocol layers are distributed in the CU for centralized control, and functions of some or all of remaining protocol layers are distributed in the DU. The CU centrally controls the DU.

In the embodiments of this application, the terminal device or the network device includes a hardware layer, an operating system layer running above the hardware layer, and an application layer running above the operating system layer. The hardware layer includes hardware such as a central processing unit (central processing unit, CPU), a memory management unit (memory management unit, MMU), and a memory (also referred to as a main memory). The operating system may be any one or more computer operating systems that implement service processing through a process (process), for example, a Linux operating system, a Unix operating system, an Android operating system, an iOS operating system, or a Windows operating system. The application layer includes applications such as a browser, an address book, word processing software, and instant messaging software. In addition, a specific structure of an execution body of methods provided in the embodiments of this application is not limited in the embodiments of this application, provided that a program that records code of the methods provided in the embodiments of this application can be run to perform communication based on the methods provided in the embodiments of this application. For example, the methods provided in the embodiments of this application may be performed by the terminal device or the network device, or by a function module that can invoke and execute the program in the terminal device or network device.

In addition, aspects or features of this application may be implemented as a method, an apparatus, or a product that uses standard programming and/or engineering technologies. The term "product" used in this application covers a computer program that can be accessed from any computer-readable component, carrier, or medium. For example, a computer-readable medium may include but is not limited to a magnetic storage component (for example, a hard disk, a floppy disk, or a magnetic tape), an optical disc (for example, a compact disc (compact disc, CD) or a digital versatile disc (digital versatile disc, DVD)), a smart card, and a flash memory component (for example, an erasable programmable read-only memory (erasable programmable read-only memory, EPROM), a card, a stick, or a key drive). In addition, various storage media described in this specification may represent one or more devices and/or other machine-readable media that are configured to store information. The term "machine-readable media" may include but is not limited to a radio channel and various other media that can store, include, and/or carry instructions and/or data.

FIG. 1 is an architectural diagram of an example of a communication system 100 to which an embodiment of this application is applicable. The method in the embodiments of this application may be applied to the communication system 100 shown in FIG. 1. It should be understood that the communication system 100 to which the method in the embodiments of this application is applicable may include more or fewer network devices or terminal devices.

A network device or a terminal device in FIG. 1 may be hardware, or may be software obtained through functional division, or a combination thereof. The network device or the terminal device in FIG. 1 may communicate with each other by using another device or network element.

In the communication system 100 shown in FIG. 1, a network device 110 and terminal devices 101 to 106 form the communication system 100. In the communication system 100, the network device 110 may send downlink data to the terminal devices 101 to 106. Certainly, the terminal devices 101 to 106 may alternatively send uplink data to the network device 110. It should be understood that the terminal devices 101 to 106 may be, for example, a cellular phone, a smartphone, a portable computer, a handheld communication device, a handheld computing device, a satellite radio apparatus, a global positioning system, a PDA, and/or any other appropriate device used for communication in the wireless communication system 100.

The communication system 100 may be a PLMN network, a device-to-device (device-to-device, D2D) network, a machine-to-machine (machine-to-machine, M2M) network, an IoT network, or another network.

In addition, the terminal devices 104 to 106 may also form a communication system. In the communication system, the terminal device 105 may send downlink data to the terminal device 104 or the terminal device 106. Correspondingly, the terminal device 104 or the terminal device 106 may also send uplink data to the terminal device 105.

Figure 2:
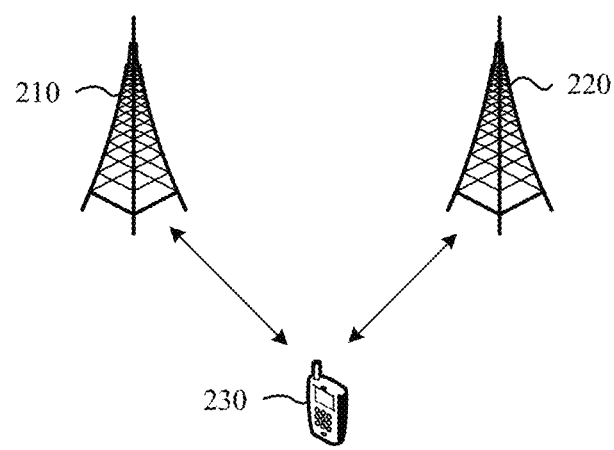
FIG. 2 is an architectural diagram of an example of another communication system to which an embodiment of this application is applicable.

FIG. 2 is an architectural diagram of an example of a communication system 200 to which an embodiment of this application is applicable. As shown in the figure, the communication system 200 may include at least two network devices such as network devices 210 and 220 shown in FIG. 2. The communication system 200 may further include at least one terminal device such as a terminal device 230 shown in FIG. 2. The terminal device 230 may establish a radio link to the network device 210 and the network device 220 by using a dual connectivity (dual connectivity, DC) technology or a multi-connectivity technology. The network device 210 may be, for example, a master base station (master gNB, MgNB), and the network device 220 may be, for example, a secondary base station (secondary gNB, SgNB). In this case, the network device 210 is a network device during initial access of the terminal device 230, and is responsible for radio resource control (radio resource control, RRC) communication with the terminal device 230. The network device 220 may be added during RRC reconfiguration, and is configured to provide an additional radio resource.

The network device 220 may alternatively be a primary base station, and the network device 210 may alternatively be a secondary base station. This is not limited in this application. In addition, for ease of understanding only, the figure shows a case in which the two network devices are connected to the terminal device in a wireless manner. However, this should not constitute any limitation on a scenario to which this application is applicable. The terminal device may further establish a radio link with more network devices.

A plurality of antennas may be configured for each communication device, such as the network device 210, the network device 220, or the terminal device 230 in FIG. 2. The plurality of antennas may include at least one transmit antenna configured to send a signal and at least one receive antenna configured to receive a signal. In addition, each communication device additionally includes a transmitter chain and a receiver chain. A person of ordinary skill in the art may understand that the transmitter chain and the receiver chain each may include a plurality of components related to signal sending and receiving (for example, a processor, a modulator, a multiplexer, a demodulator, a demultiplexer, or an antenna). Therefore, the network device and the terminal device may communicate with each other by using a multi-antenna technology.

To support low-latency transmission of URLLC services, a mini-slot concept and dynamic time domain resource allocation are introduced.

First, one TDRA table (table) may be configured for each UE by using a higher layer parameter. The table includes a plurality of rows (for example, 16 rows), and each row is corresponding to one row index (row index) and other three parameters. For downlink transmission, the three parameters are K0, an SLIV (starting and length indicator value), and a PDSCH mapping type (mapping type). For uplink transmission, the three parameters are K2, an SLIV, and a PUSCH mapping type. Meanings of these parameters are described below.

(1) K0/K2:

K0 is a difference between a number of a slot in which DCI for scheduling a PDSCH is located and a number of a slot in which the PDSCH is located. K2 is a difference between a number of a slot in which DCI for scheduling a PUSCH is located and a number of a slot in which the PUSCH is located. A slot in which the PDSCH or PUSCH scheduled by the DCI is located may be determined based on K0/K2 and a number of a slot in which the UE receives the DCI.

(2) SLIV:

The SLIV indicates a time domain symbol occupied by a PDSCH or a PUSCH in an indication slot. Currently, time domain resource allocation supports only allocation of consecutive symbols. In R15 NR, an SLIV is used to jointly indicate a starting symbol number and a length occupied by data transmission (namely, a quantity of occupied consecutive symbols).

(3) PDSCH/PUSCH Mapping Type:

The PDSCH/PUSCH mapping type may be Type A or Type B, and is mainly used to determine a position of a front-located demodulation reference signal (demodulation reference signal, DMRS) in a PDSCH/PUSCH. For Type A, the DMRS is in the third or fourth symbol of a slot. For Type B, the DMRS is in the 1st symbol of a data transmission time domain resource.

The base station may dynamically indicate a TDRA by using DCI. For example, for data transmission scheduled by the DCI, the DCI includes a TDRA bit field, and a width of the bit field is obtained after rounding up is performed on a logarithm of a quantity of rows of a TDRA table configured by a corresponding higher layer, where a base of the logarithm is 2 (where for example, 16 rows are corresponding to 4 bits). It is assumed that the TDRA bit field has N bits, values of the TDRA bit field are 0, . . . , and $2^N-1$, and the values are sequentially corresponding to rows 1 to 2^N in the TDRA table configured by the higher layer.

A concept related to DCI-scheduled data transmission is a DCI monitor occasion. A monitor period (monitor period) and monitor pattern (monitor pattern) of a PDCCH are configured by a higher layer parameter, so that the UE can determine a slot and a symbol, where the PDCCH is detected and the DCI is received on the symbol in the slot. In early LTE, a PDCCH can be located only in the first three symbols of a subframe. A PDCCH monitor pattern is introduced to allow flexible configuration of a time domain position for sending a PDCCH, thereby reducing a data scheduling-delay.

A plurality of search spaces (search spaces, SSs) may be used in the NR system, and includes search spaces of different types and search spaces that are of a same type and that have different numbers.

For example, for one SS, a monitor period P (monitor period) and an offset value S of the SS are configured by a higher layer parameter, and a number of a slot for sending DCI is determined based on P and S. A monitor pattern (monitor pattern) in a slot is further configured, is a bitmap (bit map) with a length of 14, and indicates symbols that are in the slot for sending DCI and on which the DCI can be sent. These symbols are referred to as PDCCH occasions (occasions). A managed control resource set (control resource set, CORESET) identifier (ID) is further configured, and the CORESET configuration indicates a frequency domain resource position and a time domain length that are available for DCI transmission, namely, symbols occupied starting from one PDCCH occasion. Formats of DCI that can be transmitted in the search space may be further configured, to determine a search space associated with DCI for scheduling ultra-reliable low-latency data transmission, and determine a monitor occasion used to transmit the DCI for scheduling URLLC data.

Another concept related to time domain resource allocation is a scheduling-delay. The details are as follows.
For Downlink Transmission:

The scheduling-delay is indicated by K0, and a granularity is at a slot level. At a finer granularity, in a same slot, a starting symbol of a scheduled PDSCH cannot be earlier than a starting symbol of a PDCCH carrying DCI.
For Uplink Transmission:

The scheduling-delay is indicated by K2, and a granularity is at a slot level. A UE capability is specified in NR. To be specific, when a distance between an ending symbol of the PDCCH and a starting symbol of the PUSCH is greater than or equal to a first threshold, the UE needs to be able to properly transmit the PUSCH. Herein, the distance from the ending symbol of the PDCCH to the starting symbol of the PDSCH includes time for parsing the DCI by the UE and preparation time for sending the PUSCH. A value of the first threshold is in a unit of a symbol, and the value is predefined in a protocol and is related to factors such as the UE capability and subcarrier detection.

A quantity of bits of the TDRA in the DCI may be compressed. For example, the quantity of bits of the TDRA is compressed to 2 bits. In this case, only four (K0, an SLIV, and a mapping type) combinations or four (K2, an SLIV, and a mapping type) combinations can be indicated.

Therefore, a technical problem that needs to be urgently resolved is to support flexible time domain resource allocation and provide robust scheduling flexibility and scheduling reliability in a scenario that a quantity of TDRA bits in DCI are compressed.

In addition, the UE needs to explicitly feed back a decoding result of downlink data, so that the base station performs adaptive retransmission. Currently, feedback information of downlink data transmission is referred to as a hybrid automatic repeat request (hybrid automatic repeat request, HARQ), and includes an acknowledgment/a negative acknowledgment (ACK/NACK). HARQ-ACK feedback relates to the following concepts:

(1) Timing Offset K1 of the HARQ-ACK Feedback

For downlink data transmission scheduled by DCI, the DCI includes a PDSCH-to-HARQ-timing byte, which is usually 3 bits, and indicates an offset value K1 between a PDSCH transmission slot and a corresponding ACK/NACK transmission slot. Values of the PDSCH-to-HARQ-timing byte are "000" to "111", and a specific value of the corresponding offset value K1 is configured through RRC or predefined. In normal mode, eight of the 16 values are configured through RRC, and are corresponding to values "000" to "111". The 16 values support at least 0 to 8. In rollback mode, eight predefined values are 1 to 8. In R16 NR, a granularity of K1 may further support a sub-slot (sub-slot).

(2) Uplink Control Channel Resource of the HARQ-ACK Feedback

After determining a slot/sub-slot in which an ACK/a NACK of a PDSCH is fed back, the UE further needs to determine a PUCCH resource to be used to carry the ACK/NACK. A PUCCH resource carrying a HARQ-ACK may be indicated by DCI, or may be configured by a higher layer. The former is mainly for a HARQ-ACK of a PDSCH dynamically scheduled by DCI, and the latter is mainly for a PDSCH activated by DCI and semi-persistently scheduled.

(3) HARQ-ACK Codebook (Codebook)

Because a multicarrier system and a TDD frame structure need to be supported, to reduce PUCCH overheads for separate feedback of a HARQ-ACK of each PDSCH, both LTE and NR support HARQ-ACK multiplexing. A plurality of HARQ-ACKs may point to a PUCCH resource, form a HARQ-ACK codebook, and are jointly fed back on the PUCCH resource. For the HARQ-ACK of each PDSCH, DCI for scheduling the PDSCH incidentally indicates a slot and a PUCCH that are for feeding back the corresponding HARQ-ACK, to facilitate HARQ-ACK multiplexing. For example, a feedback slot of the HARQ-ACK may be determined based on K1, and ACKs/NACKs in a same slot are combined into one codebook for joint feedback. For another example, a feedback sub-slot of the HARQ-ACK may be determined based on K1, and ACKs/NACKs in a same sub-slot form a codebook and are fed back together. Alternatively, service types or priorities of PDSCHs may be distinguished, and ACKs/NACKs of PDSCHs of a same service type or priority form a codebook and are fed back together. A HARQ-ACK codebook in NR is classified into a dynamic codebook (dynamic codebook) and a semi-static codebook (semi-static codebook). In the dynamic codebook, generation of the HARQ-ACK codebook depends on a downlink allocation index (downlink allocation index, DAI) in DCI. Therefore, when last DCI pointing to the codebook is lost, a codebook error occurs. In the semi-static codebook, the HARQ-ACK codebook is more accurately determined and does not depend on DCI. However, a size of the codebook is relatively large, and the feedback amount is relatively large. The semi-static codebook is mainly used in this application.

Figure 6:
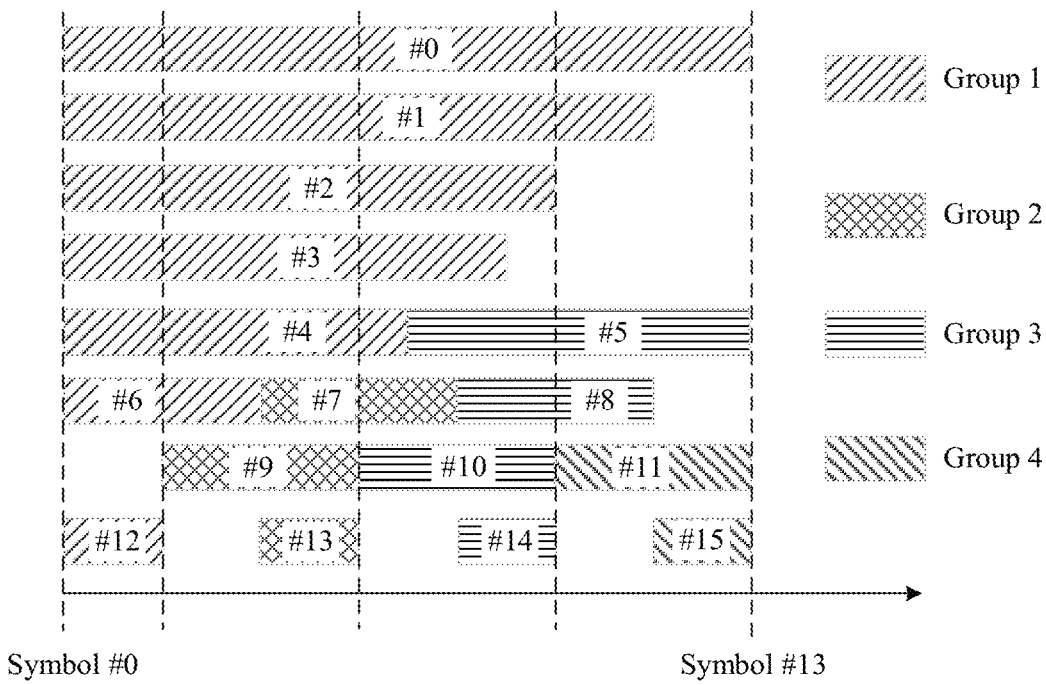
FIG. 6 is a schematic diagram of an SLIV segmentation method according to an embodiment of this application.

For a semi-static codebook, namely, a Type-1 codebook in NR, the UE obtains a set of possible values of K1 based on a higher layer configuration, and determines a PDSCH occasion set based on a TDRA table (namely, a time domain resource SLIV set specified in the TDRA table) configured by a higher layer. For a K1 value in the K1 set, the UE determines a slot/sub-slot corresponding to an uplink slot/sub-slot, and determines, based on a time domain resource SLIV set in the TDRA table configured by the higher layer, a time domain resource SLIV set included in the slot/sub-slot. The SLIVs are divided to obtain a corresponding PDSCH occasion set. A specific division rule is shown in FIG. 6. It is assumed that there are 16 time domain resources (SLIVs) in one slot (including a symbol #0 to a symbol #13). The SLIVs are respectively corresponding to #0 to #15 (namely, an SLIV #0 to an SLIV #15) in the figure, and these SLIVs may all be used for downlink data transmission. The 16 SLIVs are divided, and division positions are shown by dashed lines in FIG. 6. Four SLIV groups (groups) are obtained after division, where a group 1 includes SLIVs {#0, #1, #2, #3, #4, #6, #12}, a group 2 includes {#7, #9, #13}, a group 3 includes {#5, #8, #10, #14}, and a group 4 includes {#11, #15}. The four SLIV groups are corresponding to four PDSCH occasions. It can be learned from the foregoing division result that, a quantity of PDSCH occasions obtained through division is equal to a maximum quantity of non-overlapping SLIVs in the SLIV set, that is, K1 SLIVs are selected from the SLIV set. On the premise that any two of the K1 SLIVs do not overlap, a maximum value of K1 is found. For FIG. 6, the maximum K1 SLIVs are corresponding to the SLIVs #12, #13, #14, and #15.

To support implementation of flexible time domain resource allocation based on a time domain resource allocation bit field in compressed DCI, a method is to adaptively adjust, based on a position of DCI, a real position of a time domain resource configured by a higher layer. Consequently, a position of downlink data transmission is not limited to an SLIV set configured by a higher layer. For a semi-static codebook, how to divide SLIVs to generate a PDSCH occasion needs to be re-considered.

Based on the foregoing problem, this application provides a communication method and a communication apparatus, to improve flexibility and reliability of data transmission, and ensure that a feedback codebook may include feedback information of all potential downlink data transmission.

Figure 3:
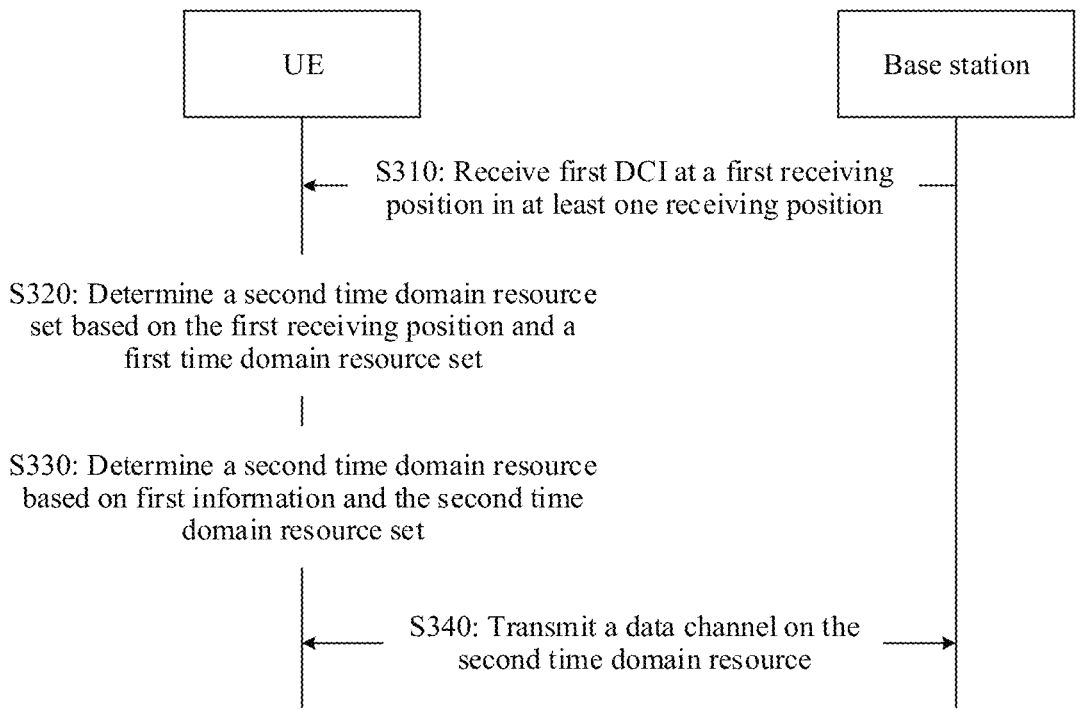
FIG. 3 is a schematic flowchart of a communication method according to an embodiment of this application.
Figure 4:
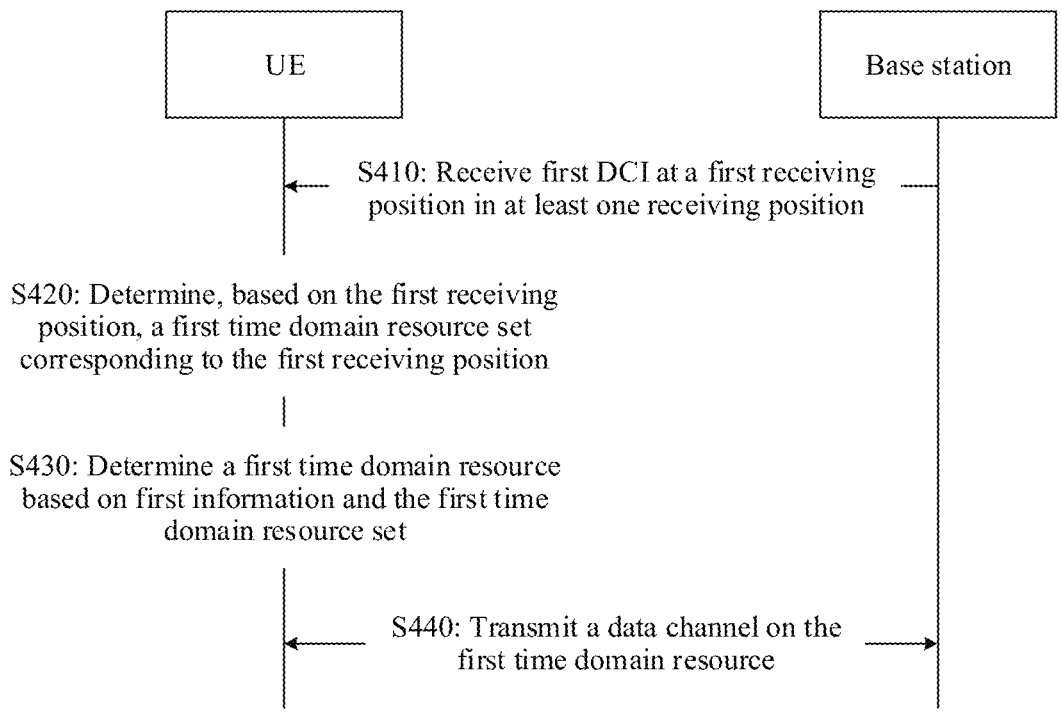
FIG. 4 is a schematic flowchart of a communication method according to another embodiment of this application.
Figure 5:
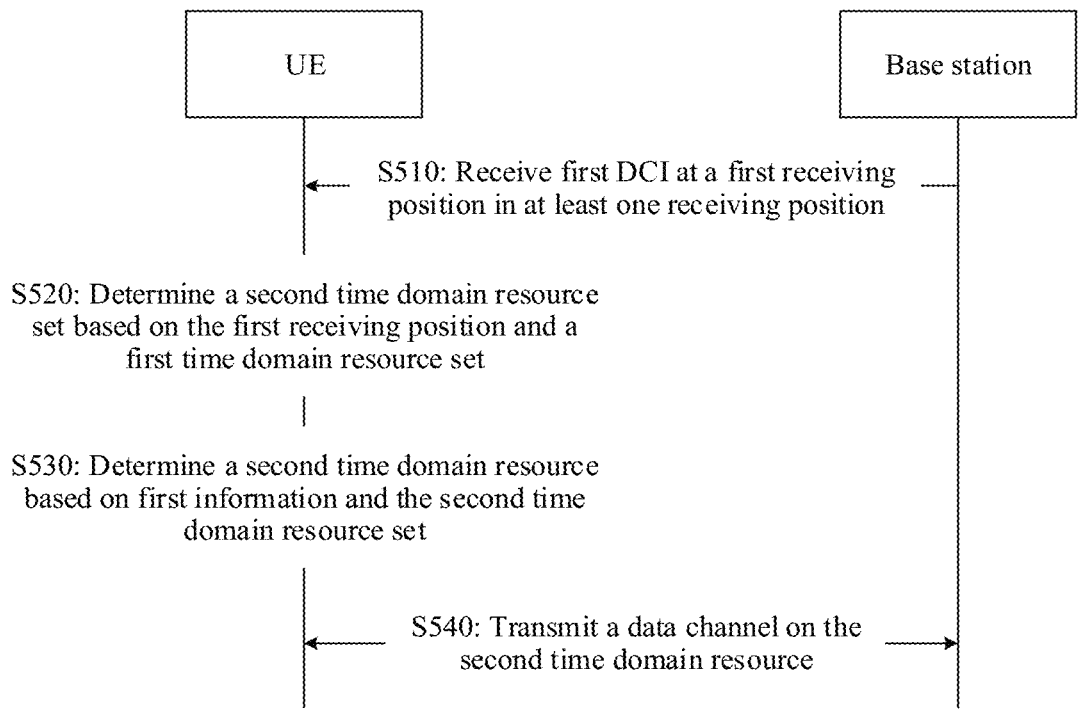
FIG. 5 is a schematic flowchart of a communication method according to another embodiment of this application.

The following describes in detail the communication method in the embodiments of this application with reference to FIG. 3 to FIG. 5. In the embodiments of this application, the communication method provided in this application is described by using a base station as a network device and a UE as a terminal device. The base station may be a gNB in an NR system. It should be understood that FIG. 3 to FIG. 5 show steps or operations of the communication method provided in this application. However, these steps or operations are merely examples. In the embodiments of this application, other operations or variations of the operations in any one of the embodiments in FIG. 3 to FIG. 5 may be further performed, or not all steps need to be performed. Alternatively, these steps may be performed in other orders.

FIG. 3 is a schematic flowchart of a communication method 300 according to an embodiment of this application. It should be understood that FIG. 3 shows steps or operations of the communication method. However, these steps or operations are merely examples. In this embodiment of this application, other operations or variations of the operations in FIG. 3 may be further performed, or not all steps need to be performed. Alternatively, these steps may be performed in other orders.

S310: A base station sends first DCI to UE at a first receiving position in at least one receiving position.

The first DCI includes first information, the first information is used to indicate time domain resource allocation, and the at least one receiving position is located in a same slot.

Optionally, the receiving position is a downlink control channel transmission position, may be represented by using a downlink control channel transmission occasion (occasion), and includes a starting symbol of the receiving position and a length of the receiving position. Optionally, the receiving position is a transmission position of a downlink control channel for scheduling URLLC data transmission. The downlink control channel may be a physical downlink control channel (physical downlink control channel, PDCCH), and correspondingly, the downlink control channel transmission occasion may be a PDCCH occasion.

Optionally, the at least one receiving position in one slot includes at least two receiving positions. Optionally, the at least one receiving position in one slot includes one receiving position, and a starting symbol of the receiving position is not the $1^{st}$ symbol of the slot.

Optionally, the first DCI is used to schedule URLLC data; the first DCI is DCI in a first format, where a payload of the DCI in the first format is the smallest in payloads of all formats of DCI for scheduling data transmission, or a value of a DCI format bit field of the first DCI is a second value, where the second value is predefined; a radio network temporary identifier (radio network temporary identifier, RNTI) of the first DCI is a first RNTI, where the first RNTI is an RNTI other than a cell radio network temporary identifier C-RNTI or a configured scheduling radio network temporary identifier CS-RNTI, for example, a MCS-C-RNTI; a search space in which the first DCI is located belongs to a first search space, where the first search space is predefined or is configured by the higher layer parameter; a control resource set in which the first DCI is located belongs to a first control resource set, where the first control resource set is predefined or is configured by a higher layer parameter; or a value of a first bit field in the first DCI is a first value, where the first bit field is used to indicate a priority or service type of data scheduled by the DCI.

Optionally, the at least one receiving position in one slot is a receiving position used to transmit DCI for scheduling URLLC data. That is, the at least one receiving position in one slot is a time domain position used for receiving the first DCI.

Optionally, a first time domain resource allocation table is used to schedule URLLC data transmission. To be specific, the first time domain resource allocation table is corresponding to the first DCI, and a width of a time domain resource allocation bit field in the first DCI is corresponding to a quantity of rows included in the first time domain resource allocation table.

Optionally, before S310, the method 300 may further include S301, S302, and S303.

S301: The base station sends configuration information of the receiving position to the UE.

The base station may configure, for the UE, a new DCI format used to schedule URLLC data transmission, for example, format 0_x (for scheduling uplink transmission) and (for scheduling downlink transmission). Alternatively, the base station may configure a new radio network temporary identifier (radio network temporary identifier, RNTI) value for the UE, for example, a URLLC-RNTI or an existing MCS-C-RNTI, where DCI scrambled by the RNTI is used to schedule URLLC data.

Alternatively, the base station may configure one or more search spaces (search spaces, SSs) for URLLC DCI, where a configuration parameter of each of the search spaces indicates a monitor period P and an offset value S of a corresponding PDCCH, and a slot is used as a unit, so that a slot for sending the DCI is determined. Further, the parameter of the search space includes a monitor pattern (monitor pattern), indicating symbols that are in a slot and on which the PDCCH can be sent.

Alternatively, the base station may configure an associated control resource set (control resource set, CORESET) for the search space, to indicate a resource position occupied by each search space in frequency domain and a length of a PDCCH occasion (namely, a quantity of occupied symbols).

Correspondingly, the UE may receive the configuration information, determine a total sending period and an offset value of the DCI for scheduling URLLC data transmission, and determine a slot for sending the DCI and a sending pattern (pattern) in the slot.

If only one search space is used to send the DCI for scheduling URLLC data, the UE determines, based on the monitor pattern, a quantity of receiving positions in one slot.

If there are a plurality of search spaces available for sending the DCI for scheduling URLLC data, a period needs to be determined, and the DCI can be sent in a plurality of slots within the period, where the period includes a plurality of receiving positions.

S302: The base station sends configuration information of a first time domain resource set to the UE.

Optionally, the first time domain resource set is determined by the first time domain resource allocation table, the first time domain resource allocation table is a TDRA table, the first time domain resource allocation table includes M rows, and each row is corresponding to one time domain resource. Optionally, downlink transmission and uplink transmission each are associated with one first time domain resource allocation table and corresponding to one first time domain resource set, where M is a positive integer greater than or equal to 2.

Optionally, any row in the first time domain resource allocation table includes a start and length indicator value (starting and length indicator value, SLIV), and does not include a scheduling-delay parameter K0 or K2. A sum of a starting symbol number S and a length L in the SLIV is less than a quantity A of symbols in one slot. In this case, one SLIV determines one time domain resource.

Optionally, any row in the first time domain resource allocation table includes an SLIV and a scheduling-delay parameter K0 or K2. A sum of a starting symbol number S and a length L in the SLIV is less than a quantity A of symbols in one slot. The scheduling-delay parameter K0 is used for downlink transmission, and indicates a difference between a number of a slot in which downlink control information DCI is located and a number of a slot in which scheduled downlink data transmission is located. The scheduling-delay parameter K2 is used for uplink transmission, and indicates a difference between the number of the slot in which the downlink control information DCI is located and a number of a slot in which scheduled uplink data transmission is located. In this case, one {SLIM, K0/K2} determines one time domain resource. A starting symbol number S of the time domain resource and a sum of the starting symbol number S and a length L may be greater than or equal to the quantity A of symbols in one slot. Optionally, transmitting a data channel on a second time domain resource includes: for downlink transmission, receiving a downlink data channel on the second time domain resource; and for uplink transmission, sending an uplink data channel on the second time domain resource.

Optionally, for a normal cyclic prefix configuration, the quantity A in one slot is equal to 14, and for an extended cyclic prefix configuration, the quantity A in one slot is equal to 12.

Optionally, the time domain resource is corresponding to a section of consecutive symbols in time domain. Optionally, the starting symbol number S of the time domain resource is numbered relative to the $1^{st}$ symbol (namely, the symbol 0) of the slot in which the first DCI is located.

Correspondingly, the UE may receive the configuration information, and determine a first time domain resource allocation table corresponding to a receiving position at which each DCI for scheduling URLLC data transmission is located.

S303: The base station sends configuration information of a codebook mode to the UE.

The configuration information may indicate the UE to perform semi-static (Type-1) codebook feedback, and indicate codebook-related parameter information, including a set (K1 set) of timing offset values K1 from all potential downlink data channels to feedback information, a resource set of PUCCHs carrying the feedback information, and the like, where K1 is a slot offset value between a PDSCH transmission slot and feedback information corresponding to the PDSCH transmission slot.

After S310, the method further includes: S320: The UE determines a second time domain resource set based on the first receiving position and the first time domain resource set.

The first time domain resource set includes a plurality of time domain resources, and the first time domain resource set is predefined or is configured by a higher layer parameter.

Optionally, the UE may determine the second time domain resource set based on the first time domain resource set.

In this application, that the UE determines the second time domain resource set based on the first receiving position and the first time domain resource set includes the following several cases.

Case 1:

The UE determines the second time domain resource set based on a first reference symbol and the first time domain resource set, where the first reference symbol is a starting symbol of the first receiving position or the first reference symbol is a sum of an ending symbol of the first receiving position and a first offset, and the first offset is predefined or is configured by a higher layer parameter.

Optionally, for downlink transmission, the first reference symbol is the starting symbol of the first receiving position; and for uplink transmission, the first reference symbol is the sum of the ending symbol of the first receiving position and the first offset.

Optionally, for both downlink transmission and uplink transmission, the first reference symbol is the starting symbol of the first receiving position.

Optionally, the first offset is shortest processing time from receiving of a downlink control channel to sending of an uplink data channel by a terminal device, and is in a unit of symbol. For example, the shortest processing time may be processing time N2 or a sum of N2 and a preset offset value. A value of first offset is related to factors such as a subcarrier spacing and a capability type of the terminal device.

Case 2:

The UE determines the second time domain resource set based on a first reference symbol and the first time domain resource set, where a value of the first reference symbol is a first value or a second value, the first value is a symbol 0, the second value is a starting symbol of the first receiving position or the second value is a sum of an ending symbol of the first receiving position and a first offset, and the first offset is predefined or is configured by a higher layer parameter.

That the first value is a symbol 0 means that the first reference symbol is the $1^{st}$ symbol of the slot in which the first DCI is located, namely, the symbol 0. The symbol 0 may also be understood as a slot boundary.

In a possible implementation, that the UE determines the second time domain resource set based on the first receiving position and the first time domain resource set includes: The UE determines whether to use the first receiving position to determine the second time domain resource set. When the first reference symbol is the first value (namely, the symbol 0), the first receiving position may not be used to determine the second time domain resource set. In other words, when the first reference symbol is the symbol 0, the UE may determine the second time domain resource set directly based on the first time domain resource set. When the first reference symbol is the second value, the first receiving position may be used to determine the second time domain resource set.

Optionally, the base station may further send a first parameter to the UE, where the first parameter indicates that the value of the first reference symbol is the first value or the second value.

Optionally, the first parameter is a radio resource control (radio resource control, RRC) parameter.

Optionally, the base station may indicate the value of the first reference symbol to the UE in another manner.

Optionally, the value of the first reference symbol is determined by the first time domain resource set or the first time domain resource allocation table associated with the first time domain resource set.

For example, when a quantity of rows included in the first time domain resource set is greater than or equal to a first threshold, the value of the first reference symbol is the first value; or when a quantity of rows included in the first time domain resource set is less than a first threshold, the value of the first reference symbol is the second value, where the first threshold is predefined or is configured by a higher layer parameter.

For another example, when the first time domain resource allocation table associated with the first time domain resource set includes a parameter for a scheduling-delay between a downlink control channel and a data channel, the value of the first reference symbol is the first value; or when the first time domain resource allocation table associated with the first time domain resource set does not include a parameter for a scheduling-delay between a downlink control channel and a data channel, the value of the first reference symbol is the second value.

Optionally, a value of the first threshold is 5. Optionally, the value of the first threshold is determined by a width of a time domain resource allocation bit field in the first DCI for scheduling URLLC data transmission.

Optionally, the parameter for a scheduling-delay between the downlink control channel and the data channel is K0 or K2.

It should be noted that, for the case 1 and the case 2, the determining the second time domain resource set based on a first reference symbol and the first time domain resource set may further include: determining M first-type time domain resources, where a difference between a starting symbol of an $i^{th}$ time domain resource in the M first-type time domain resources and the first reference symbol is equal to a starting symbol of an $i^{th}$ time domain resource in the first time domain resource set, and a length of the $i^{th}$ time domain resource in the M first-type time domain resources is equal to a length of the $i^{th}$ time domain resource in the first time domain resource set, where i and M are positive integers, and i is less than or equal to M; and determining M second-type time domain resources based on the M first-type time domain resources, where the second time domain resource set includes the M second-type time domain resources.

A difference between starting symbols of two time domain resources is equivalent to a difference between numbers of the starting symbols of the two time domain resources, or is equivalent to a distance (where the distance is in a unit of a quantity of symbols) of the starting symbols of the two time domain resources.

Optionally, the first-type time domain resource is a time domain resource obtained after a time domain resource in the first time domain resource set is translated based on the first reference symbol. For example, for downlink data transmission, the first reference symbol is the $1^{st}$ symbol of the first receiving position. In this case, a starting symbol of a first time domain resource in the first time domain resource set is 0 (a slot boundary or the $1^{st}$ symbol relative to a slot in which the first receiving position is located), and has a length of 7, that is, occupies symbols 0 to 6. When the first receiving position is located at the symbol 4, the first time domain resource is located at the symbol 4 to a symbol 10 after being translated based on the first receiving position. That is, a starting position is the symbol 4, and the length is 7. The translated time domain resource is one of the first-type time domain resources. For another example, if the first receiving position is a symbol 12, the first time domain resource is located in symbols 12 and 13 and symbols 0 to 4 of a next slot after being translated based on the first receiving position. That is, the starting position is the symbol 12 of the slot in which the first receiving position is located, and the length is 7. The translated time domain resource is one of the first-type time domain resources.

The starting symbol and an ending symbol of the $i^{th}$ first-type time domain resource belong to a same slot, and an $i^{th}$ second-type time domain resource is the $i^{th}$ first-type time domain resource.

Optionally, the $i^{th}$ first-type time domain resource is any one of the M first-type time domain resources, namely, any first-type time domain resource in the M first-type time domain resources, satisfying that a starting symbol and a receiving symbol are located in a same slot.

Alternatively, when the starting symbol and an ending symbol of the $i^{th}$ first-type time domain resource do not belong to a same slot, a starting symbol of an $i^{th}$ second-type time domain resource is the starting symbol of the $i^{th}$ first-type time domain resource, and an ending symbol of the $i^{th}$ second-type time domain resource is an ending symbol of a slot in which the starting symbol of the $i^{th}$ first-type time domain resource is located; or when the starting symbol and an ending symbol of the $i^{th}$ first-type time domain resource do not belong to a same slot, a starting symbol of an $i^{th}$ second-type time domain resource is the $1^{st}$ symbol of a slot next to a slot in which the starting symbol of the $i^{th}$ first-type time domain resource is located, and a length of the $i^{th}$ second-type time domain resource is equal to a length of the $i^{th}$ first-type time domain resource.

Optionally, when the starting symbol and the ending symbol of the $i^{th}$ first-type time domain resource do not belong to one slot, the $i^{th}$ second-type time domain resource is empty. In other words, when the starting symbol and the ending symbol of the $i^{th}$ first-type time domain resource do not belong to one slot, the corresponding $i^{th}$ second-type time domain resource is a virtual time domain resource that does not exist. Correspondingly, when the second time domain resource indicated by the first information is the $i^{th}$ second-type time domain resource, the terminal device and a network device do not need to send and receive data on the time domain resource.

Optionally, the base station ensures, through scheduling, that the first-type time domain resource does not cross a slot boundary. In this case, the second-type time domain resource is the first-type time domain resource.

Optionally, for one time domain resource in the first-type time domain resources, when a starting symbol and an ending symbol of the time domain resource belong to a same slot, the time domain resource is one of the second-type time domain resources; or when a starting symbol and an ending symbol of the time domain resource do not belong to a same slot, the time domain resource is one of the second-type time domain resources after amendment. An amendment method is to truncate the time domain resource. For example, a starting symbol of a time domain resource in the first-type time domain resources is the symbol 12 of the slot in which the first receiving position is located, and an ending position is a symbol 4 of a next slot. In this case, a starting symbol position of the time domain resource after truncation remains unchanged, and the ending symbol is the last symbol of the slot in which the starting symbol is located, namely, a symbol 13. Correspondingly, a starting symbol of a time domain resource that is in the second-type time domain resources and that is corresponding to a time domain resource in the first-type time domain resources is the symbol 12 of the slot in which the first receiving position is located, an ending symbol is the symbol 13 of the slot in which the first receiving position is located, and a length is 2.

Another amendment method is to delay. For example, a starting symbol of a time domain resource in the first-type time domain resources is the symbol 12 of the slot in which the first receiving position is located, and an ending symbol is the symbol 4 of the next slot. In this case, the starting symbol of the delayed time domain resource is the $1^{st}$ symbol of the next slot of the slot in which the first receiving position is located, namely, a symbol 0, and an ending position is a symbol 6 of the slot, and a length is 7. Correspondingly, a starting symbol of a time domain resource that is in the second-type time domain resources and that is corresponding to a time domain resource in the first-type time domain resources is the symbol 0 of the next slot of the slot in which the first receiving position is located, an ending symbol is the symbol 6 of the next slot of the slot in which the first receiving position is located, and a length is 7.

Case 3:

The UE determines M first-type time domain resources, where a difference between a starting symbol of an $i^{th}$ time domain resource in the M first-type time domain resources and an $i^{th}$ reference symbol is equal to a starting symbol of an $i^{th}$ time domain resource in the first time domain resource set, and a length of the $i^{th}$ time domain resource in the M first-type time domain resources is equal to a length of the $i^{th}$ time domain resource in the first time domain resource set, where i and M are positive integers, i is less than or equal to M, and the $i^{th}$ reference symbol is determined by a first parameter associated with the $i^{th}$ time domain resource in the first time domain resource set; and determines K second-type time domain resources based on the M first-type time domain resources, and determines K third-type time domain resources based on the K second-type time domain resources, where the second time domain resource set includes the K third-type time domain resources, and K and M are positive integers.

Optionally, the first parameter associated with the $i^{th}$ time domain resource in the first time domain resource set is at least one of a reference symbol indication parameter associated with the $i^{th}$ time domain resource, a parameter for a scheduling-delay between a downlink control channel and a data channel, the starting symbol of the $i^{th}$ time domain resource, the length of the $i^{th}$ time domain resource, and a mapping type corresponding to the $i^{th}$ time domain resource.

Optionally, the reference symbol indication parameter associated with the $i^{th}$ time domain resource indicates that a value of the $i^{th}$ reference symbol is a first value or a second value. Optionally, any row in a first time domain resource allocation table includes the reference symbol indication parameter.

Alternatively, when a scheduling-delay that is between the control channel and the data channel and that is associated with the $i^{th}$ time domain resource is greater than 0, the value of the $i^{th}$ reference symbol is the first value; or when a scheduling-delay that is between the downlink control channel and the data channel and that is associated with the $i^{th}$ time domain resource is equal to 0, the value of the $i^{th}$ reference symbol is the second value. Optionally, when the $i^{th}$ time domain resource is associated with one scheduling-delay, the value of the $i^{th}$ reference symbol is the first value; or when the $i^{th}$ time domain resource is not associated with a scheduling-delay, the value of the $i^{th}$ reference symbol is the second value.

Alternatively, when a time domain length of the $i^{th}$ time domain resource does not belong to a first length set, the value of the $i^{th}$ reference symbol is the first value; or when a time domain length of the $i^{th}$ time domain resource belongs to a first length set, the value of the $i^{th}$ reference symbol is the second value, where the first length set is predefined or is configured by a higher layer parameter. Optionally, the first set is {2, 4}, {2, 7}, or {2, 4, 7}.

Alternatively, when the starting symbol of the $i^{th}$ time domain resource is greater than a first threshold, the value of the $i^{th}$ reference symbol is the first value; or when the starting symbol of the $i^{th}$ time domain resource is less than or equal to a first threshold, the value of the $i^{th}$ reference symbol is the second value, where the first threshold is predefined or is configured by a higher layer parameter.

Optionally, the first threshold is 6 or 3.

Alternatively, when the mapping type associated with the $i^{th}$ time domain resource is a first type, the value of the $i^{th}$ reference symbol is a first value; or when the mapping type associated with the $i^{th}$ time domain resource is a second type, the value of the $i^{th}$ reference symbol is a second value, where the first type and the second type are predefined or are configured by higher layer parameters.

Optionally, the first type indicates that a demodulation reference signal of the data channel is located in the third symbol or fourth symbol of a slot in which the data channel is located, and the second type indicates that a demodulation reference signal of the data channel is located in the $1^{st}$ symbol of a time domain resource in which the data channel is located.

The first value is a symbol 0, the second value is a starting symbol of the receiving position of the first DCI or a sum of an ending symbol of the receiving position of the first DCI and a first offset, and the first offset is predefined or is configured by a higher layer parameter.

Optionally, the first-type time domain resource is a time domain resource obtained after a time domain resource in the first time domain resource set is translated based on the first reference symbol. When the first reference symbol is a first value, the first-type time domain resource is a time domain resource in the first time domain resource set; or when the first reference symbol is a first value, the first-type time domain resource is a time domain resource obtained after the time domain resource in the first time domain resource set is translated based on a starting symbol of the first receiving position, or a time domain resource obtained after the time domain resource in the first time domain resource set is translated based on the $1^{st}$ symbol obtained through adding an ending symbol of the first receiving position to a first offset.

For example, when the first reference symbol is the starting symbol of the first receiving position, a starting symbol of a first time domain resource in the first time domain resource set is 0 (a slot boundary or the $1^{st}$ symbol relative to a slot in which the first receiving position is located), and has a length of 7, that is, occupies symbols 0 to 6. When the first receiving position is located at the symbol 4, the first time domain resource is located at the symbol 4 to a symbol 10 after being translated based on the first receiving position. That is, a starting position is the symbol 4, and the length is 7. The translated time domain resource is one of the first-type time domain resources. For another example, if the first receiving position is a symbol 12, the first time domain resource is located in symbols 12 and 13 and symbols 0 to 4 of a next slot after being translated based on the first receiving position. That is, the starting position is the symbol 12 of the slot in which the first receiving position is located, and the length is 7. The translated time domain resource is one of the first-type time domain resources.

Optionally, K is equal to M, and the K second-type time domain resources are the M first-type time domain resources. Alternatively, K is less than or equal to M, and the K second-type time domain resources are K time domain resources that are in the M first-type time domain resources and whose corresponding reference symbols are the second values.

For example, the first time domain resource set includes 16 time domain resources, and associated reference symbols of only four time domain resources in the 16 time domain resources are the second values. In this case, the first-type time domain resources include the 16 time domain resources, and are time domain resources obtained after the 16 time domain resources included in the first time domain resource set are translated based on the first reference symbol; and the second-type time domain resources include four time domain resources, and are time domain resources obtained after the four time domain resources whose associated reference symbols are the second values and that are in the 16 time domain resources included in the first time domain resource set are translated based on the first reference symbol.

Optionally, the UE may determine the K third-type time domain resources based on the K second-type time domain resources, where a starting symbol and an ending symbol of a $i^{th}$ second-type time domain resource belong to one slot, and a $i^{th}$ third-type time domain resource is the $j^{th}$ second-type time domain resource, where j is a positive integer, and j is less than or equal to K.

Optionally, the UE may determine the K third-type time domain resources based on the K second-type time domain resources. When a starting symbol and an ending symbol of a $i^{th}$ second-type time domain resource do not belong to one slot, a $i^{th}$ third-type time domain resource is empty; and/or when the starting symbol and the ending symbol of the $i^{th}$ second-type time domain resource do not belong to one slot, a starting symbol of the $i^{th}$ third-type time domain resource is the starting symbol of the $j^{th}$ second-type time domain resource, and an ending symbol of the $i^{th}$ third-type time domain resource is an ending symbol of a slot in which the starting symbol of the $i^{th}$ second-type time domain resource is located; and/or when the starting symbol and the ending symbol of the $i^{th}$ second-type time domain resource do not belong to one slot, the starting symbol of the $i^{th}$ third-type time domain resource is the $1^{st}$ symbol of a slot next to a slot in which the starting symbol of the $i^{th}$ second-type time domain resource is located, and a length of the $i^{th}$ third-type time domain resource is equal to a length of the $j^{th}$ second-type time domain resource.

Optionally, the base station ensures, through scheduling, that the second-type time domain resource does not cross a slot boundary. In this case, the third-type time domain resource is the second-type time domain resource.

Optionally, for one time domain resource in the second-type time domain resources, when a starting symbol and an ending symbol of the time domain resource belong to a same slot, the time domain resource is one of the third-type time domain resources; or when a starting symbol and an ending symbol of the time domain resource do not belong to a same slot, the time domain resource is one of the third-type time domain resources after amendment. An amendment method is to truncate the time domain resource. For example, a starting symbol of a time domain resource in the second-type time domain resources is a symbol 12 of the slot in which the first receiving position is located, and an ending position is a symbol 4 of a next slot. In this case, a starting symbol position of the time domain resource after truncation remains unchanged, and the ending symbol is the last symbol of the slot in which the starting symbol is located, namely, a symbol 13. Correspondingly, a starting symbol of a time domain resource that is in the third-type time domain resources and that is corresponding to a time domain resource in the second-type time domain resources is the symbol 12 of the slot in which the first receiving position is located, an ending symbol is the symbol 13 of the slot in which the first receiving position is located, and a length is 2.

Another amendment method is to delay. For example, a starting symbol of a time domain resource in the second-type time domain resources is the symbol 12 of the slot in which the first receiving position is located, and an ending symbol is the symbol 4 of the next slot. In this case, the starting symbol of the delayed time domain resource is the $1^{st}$ symbol of the next slot of the slot in which the first receiving position is located, namely, a symbol 0, and an ending position is a symbol 6 of the slot, and a length is 7. Correspondingly, a starting symbol of a time domain resource that is in the third-type time domain resources and that is corresponding to a time domain resource in the second-type time domain resources is the symbol 0 of the next slot of the slot in which the first receiving position is located, an ending symbol is the symbol 6 of the next slot of the slot in which the first receiving position is located, and a length is 7.

It may be understood that the first-type time domain resource, the second-type time domain resource, and the third-type time domain resource may respectively correspond to different types of SLIVs. For example, the first-type time domain resource may be corresponding to a translated SLIV, and the second-type time domain resource may be corresponding to a translated and modified SLIV.

S330: The UE determines the second time domain resource based on the first information and the second time domain resource set.

The second time domain resource is one of a plurality of time domain resources included in the second time domain resource set.

S340: The UE and the base station transmit a data channel on the second time domain resource.

It should be noted that transmission of the data channel herein may also be understood as transmission of data on the data channel or transmission of data by using the data channel. For example, the transmission of the data channel may include that the UE sends a PUSCH to the base station, or the base station sends a PDSCH to the UE. In other words, the transmission of the data channel may include that the UE sends data to the base station by using the PUSCH, or may include that the base station sends data to the UE by using the PDSCH. This is not limited in this application.

According to the method provided in this embodiment of this application, the second time domain resource set is determined based on the first receiving position and the first time domain resource set, the second time domain resource is determined in the second time domain resource set based on the first information, and the data channel is transmitted on the second time domain resource. Because the second time domain resource is associated with the receiving position, flexibility and reliability of data transmission can be improved.

Optionally, after S340, the method 300 may further include S304 and S305.

S304: The UE generates a codebook.

The codebook may be a semi-static codebook.

Optionally, the UE may generate the codebook in the following two manners.

Manner 1:

The UE determines a first downlink data transmission occasion set based on the second time domain resource set, where a quantity of downlink data transmission occasions included in the first downlink data transmission occasion set is equal to a maximum quantity of non-overlapping time domain resources included in the second time domain resource set; determines a second downlink data transmission occasion set, where the second downlink data transmission occasion set is a union set of at least one first downlink data transmission occasion set, and the at least one first downlink data transmission occasion set is determined based on at least one second time domain resource set corresponding to the at least one receiving position that is in the same slot; and generates a first codebook, where the first codebook is corresponding to feedback information of a downlink data transmission occasion in the second downlink data transmission occasion set.

Optionally, the maximum quantity of non-overlapping time domain resources included in the second time domain resource set means that K1 time domain resources are selected from the second time domain resource set, and any two of the K1 time domain resources do not overlap. The maximum quantity of non-overlapping time domain resources is equal to a maximum value of K1 that can be found.

Optionally, before the maximum quantity of non-overlapping time domain resources included in the second time domain resource set is determined, a new second time domain resource set is obtained after each time domain resource in the second time domain resource set is translated to one slot, and a maximum quantity of non-overlapping time domain resources included in the new second time domain resource set is determined. For example, for a second time domain resource in the second time domain resource set, if a starting symbol S is greater than or equal to n*A and less than (n+1)*A, where A is a quantity of symbols in one slot, a starting symbol S' of a time domain resource obtained after the second time domain resource is translated is S−n*A.

Optionally, the UE determines at least one slot or sub-slot based on a predefined or higher-layer configured set (K1 set) of timing offset values from the downlink data channel to the feedback information, and determines, based on a time domain resource position in the second time domain resource set or in a new second time domain resource set, a time domain resource set belonging to the at least one slot or sub-slot. The UE determines, based on the time domain resource set that belongs to the at least one slot or sub-slot, that a maximum quantity of non-overlapping time domain resources included in the time domain resource set form the first downlink data transmission occasion set.

Optionally, that the first codebook is corresponding to feedback information of a downlink data transmission occasion in the second downlink data transmission occasion set includes: The first codebook is corresponding to a union set of feedback information of downlink data transmission occasions included in a second downlink data transmission occasion set corresponding to the at least one slot or sub-slot.

Manner 2:

The UE determines a third time domain resource set, where the third time domain resource set is a union set of at least one second time domain resource set corresponding to the at least one receiving position that is in the same slot; determines a third downlink data transmission occasion set, where a quantity of downlink data transmission occasions included in the third downlink data transmission occasion set is equal to a maximum quantity of non-overlapping time domain resources included in the third time domain resource set; and generates a second codebook, where the second codebook is corresponding to feedback information of all downlink data transmission occasions in the third downlink data transmission occasion set.

Similarly, the maximum quantity of non-overlapping time domain resources included in the third time domain resource set means that K2 time domain resources are selected from the third time domain resource set, and any two of the K2 time domain resources do not overlap. The maximum quantity of non-overlapping time domain resources is equal to a maximum value of K2 that can be found.

Optionally, before the maximum quantity of non-overlapping time domain resources included in the third time domain resource set is determined, a new third time domain resource set is obtained after each time domain resource in the third time domain resource set is translated to one slot, and a maximum quantity of non-overlapping time domain resources included in the new third time domain resource set is determined. For a third time domain resource in the third time domain resource set, if a starting symbol S is greater than or equal to n*A and less than (n+1)*A, where A is a quantity of symbols in one slot, a starting symbol S' of a time domain resource obtained after the third time domain resource is translated is S−n*A.

Optionally, the UE determines at least one slot or sub-slot based on a predefined or higher-layer configured set K1 set of timing offset values from the downlink data channel to the feedback information, and determines, based on a time domain resource position in the third time domain resource set or in a new third time domain resource set, a time domain resource set belonging to the at least one slot or sub-slot. The UE determines, based on the time domain resource set that belongs to the at least one slot or sub-slot, that a maximum quantity of non-overlapping time domain resources included in the time domain resource set form the third downlink data transmission occasion set.

Optionally, that the first codebook is corresponding to feedback information of a downlink data transmission occasion in the third downlink data transmission occasion set includes: The first codebook is corresponding to a union set of feedback information of downlink data transmission occasions included in a third downlink data transmission occasion set corresponding to the at least one slot or sub-slot.

Feedback information included in the codebook generated by using the foregoing method may be corresponding to any time domain resource in at least one time domain resource set corresponding to the at least one receiving position, and a size of the codebook is corresponding to a maximum quantity of non-overlapping time domain resources in the at least one time domain resource set. Therefore, the feedback codebook can be ensured to include feedback information of all potential downlink data transmission, and feedback overheads can be reduced, thereby ensuring correct and efficient feedback of the feedback information.

S305: The UE sends the codebook to the base station.

Corresponding to the manner 1 in S304, the UE may send the first codebook in a first uplink time unit, where the first uplink time unit is an uplink slot or sub-slot, the first uplink time unit is determined based on second information, and the first DCI includes the second information.

For example, the UE determines a first uplink control channel resource based on a size of the first codebook, and sends the first codebook on the first uplink control channel resource in the first uplink time unit.

Corresponding to the manner 2 in S304, the UE may send the second codebook in a second uplink time unit, where the second uplink time unit is an uplink slot or sub-slot, the second uplink time unit is determined based on third information, and the first DCI includes the third information.

For example, the UE determines a second uplink control channel resource based on a size of the second codebook, and sends the second codebook on the second uplink control channel resource in the second uplink time unit.

Correspondingly, the base station may receive the codebook sent by the UE.

For example, for the manner 1, the base station may determine a first downlink data transmission occasion set based on the second time domain resource set, where a quantity of downlink data transmission occasions included in the first downlink data transmission occasion set is equal to a maximum quantity of non-overlapping time domain resources included in the second time domain resource set; determine a second downlink data transmission occasion set, where the second downlink data transmission occasion set is a union set of at least one first downlink data transmission occasion set, and the at least one first downlink data transmission occasion set is determined based on at least one second time domain resource set corresponding to the at least one receiving position that is in the same slot; and receive a first codebook, where the first codebook is corresponding to feedback information of a downlink data transmission occasion in the second downlink data transmission occasion set. Optionally, the base station determines a first uplink control channel resource, where the first uplink control channel resource is corresponding to a size of the first codebook; and receives the first codebook on the first uplink control channel resource in the first uplink time unit. Optionally, after receiving the first codebook in the first uplink time unit, the base station performs decoding based on the size of the first codebook.

For another example, for the manner 2, the base station may determine a third time domain resource set, where the third time domain resource set is a union set of at least one second time domain resource set corresponding to the at least one receiving position that is in the same slot; determine a third downlink data transmission occasion set, where a quantity of downlink data transmission occasions included in the third downlink data transmission occasion set is equal to a maximum quantity of non-overlapping time domain resources included in the third time domain resource set; and receive a second codebook, where the second codebook is corresponding to feedback information of all downlink data transmission occasions in the third downlink data transmission occasion set. Optionally, the base station determines a second uplink control channel resource, where the second uplink control channel resource is corresponding to a size of the second codebook; and receives the first codebook on the second uplink control channel resource in a second uplink time unit. Optionally, after receiving the second codebook in the second uplink time unit, the base station performs decoding based on the size of the second codebook.

A specific codebook determining manner is the same as that on the UE side, and details are not described herein again.

FIG. 4 is a schematic flowchart of a communication method 400 according to an embodiment of this application.

S410: A base station sends first DCI to UE at a first receiving position in at least one receiving position.

The first DCI includes first information, the first information is used to indicate time domain resource allocation, and the at least one receiving position is located in a same slot.

In the method 400, descriptions of the receiving position and the first DCI are similar to those in the method 300, and details are not described herein again.

Optionally, before S410, the method 400 may further include S401, S402, and S403.

For S401, refer to S301 in the method 300; for S402, refer to S302 in the method 300; for S403, refer to S303 in the method 300. Details are not described herein again.

Optionally, the base station may configure at least one first time domain resource set for the UE in the method 400. The at least one time domain resource set is respectively corresponding to at least one receiving position by using at least one time domain resource allocation table.

For example, when there are a plurality of receiving positions, the base station may configure one first time domain resource allocation table for each of the plurality of receiving positions.

Descriptions of the time domain resource set, the time domain resource, and the time domain resource allocation table are similar to those in the method 300, and details are not described herein again.

S420: The UE determines, based on the first receiving position, a first time domain resource set corresponding to the first receiving position.

The first time domain resource set is one of at least one first time domain resource set configured by a higher layer or predefined.

S430: Determine a first time domain resource based on the first information and the first time domain resource set.

The first time domain resource is one of a plurality of time domain resources included in the first time domain resource set.

S440: Transmit a data channel on the first time domain resource.

It should be noted that transmission of the data channel herein may mean that the UE sends a PUSCH to the base station, or may mean that the base station sends a PDSCH to the UE.

This is not limited in this application.

According to the method provided in this embodiment of this application, the first time domain resource set corresponding to the first receiving position is determined based on the first receiving position, the first time domain resource is determined in the first time domain resource set based on the first information, and the data channel is transmitted on the first time domain resource. Because the first time domain resource is associated with the receiving position, flexibility and reliability of data transmission can be improved.

Optionally, the method 400 may further include S404 and S405.

For S404, refer to S304 in the method 300, and for S405, refer to S305 in the method 300. Details are not described herein again.

A codebook generated by using the foregoing method includes a union set of at least one time domain resource set corresponding to at least one receiving position, and any two time domain resources in the at least one time domain resource set do not overlap. Therefore, the feedback codebook can be ensured to include feedback information of all potential downlink data transmission, thereby ensuring correct feedback of the feedback information.

FIG. 5 is a schematic flowchart of a communication method 500 according to an embodiment of this application.

S510: A base station sends first DCI to UE at a first receiving position in at least one receiving position.

The first DCI includes first information, the first information is used to indicate time domain resource allocation, and the at least one receiving position is located in a same slot.

In the method 500, descriptions of the receiving position, a first time domain resource set, a time domain resource, and the first DCI are similar to those in the method 300, and details are not described herein again.

In the method 500, descriptions of the receiving position, a first time domain resource, and the first DCI are similar to those in the method 300, and details are not described herein again.

Optionally, before S510, the method 500 may further include S501, S502, and S503.

For S501, refer to S301 in the method 300; for S502, refer to S302 in the method 300; for S503, refer to S303 in the method 300. Details are not described herein again.

S520: Determine a second time domain resource set based on the first receiving position and the first time domain resource set.

The first time domain resource set includes a plurality of time domain resources, and the first time domain resource set is predefined or is configured by a higher layer parameter.

Optionally, the first time domain resource set is determined by a first time domain resource allocation table.

Optionally, a time domain resource in the first time domain resource set or in a first time domain resource allocation table corresponding to the first time domain resource set is associated with a first parameter, and the first parameter indicates one of the at least one receiving position.

In a possible implementation, the second time domain resource set includes the first time domain resource, the first time domain resource belongs to the first time domain resource set, and a receiving position indicated by the first parameter corresponding to the first time domain resource is the first receiving position.

For example, each row included in the first time domain resource allocation table has a corresponding first parameter, and the first parameter indicates a corresponding receiving position of a time domain resource corresponding to the row.

In another possible implementation, the second time domain resource set includes the first time domain resource, where the first time domain resource belongs to the first time domain resource set, and the first time domain resource is one of earliest K time domain resources whose starting symbols are not earlier than a first reference symbol; or the second time domain resource set includes a third time domain resource, where the third time domain resource belongs to the first time domain resource set, a second time domain resource is one of earliest K time domain resources whose starting symbols are not earlier than the first reference symbol and that do not belong to a third time domain resource set, the third time domain resource set is determined based on a receiving position of second DCI, and the receiving position of the second DCI is earlier than a receiving position of the first DCI.

Optionally, K is predefined or is configured by a higher layer parameter, and the first reference symbol is a starting symbol of the first receiving position or the first reference symbol is a sum of an ending symbol of the first receiving position and a first offset, where the first offset is predefined or is configured by a higher layer parameter.

For example, K is determined based on a width of a time domain resource allocation bit field in the first DCI transmitted at the first receiving position. Optionally, K is the same for the width of the time domain resource allocation bit field in the first DCI transmitted at the at least one receiving position in one slot.

S530: Determine the second time domain resource based on the first information and the second time domain resource set.

The second time domain resource is one of a plurality of time domain resources included in the second time domain resource set.

S540: Transmit a data channel on the second time domain resource.

It should be noted that transmission of the data channel herein may mean that the UE sends a PUSCH to the base station, or may mean that the base station sends a PDSCH to the UE. This is not limited in this application.

According to the method provided in this embodiment of this application, the second time domain resource set is determined based on the first receiving position and the first time domain resource set, the second time domain resource is determined in the second time domain resource set based on the first information, and the data channel is transmitted on the second time domain resource. Because the second time domain resource is associated with the receiving position, flexibility and reliability of data transmission can be improved.

Optionally, the method 500 may further include S504 and S505.

For S504, refer to S304 in the method 300, and for S505, refer to S305 in the method 300. Details are not described herein again.

In particular, a codebook may alternatively be generated in the following manner 3 in S504 or S505.

Manner 3:

The UE determines a fourth downlink data transmission occasion set, where a quantity of downlink data transmission occasions included in the fourth downlink data transmission occasion set is equal to a maximum quantity of non-overlapping time domain resources included in the first time domain resource set; and generates a third codebook, where the third codebook is corresponding to feedback information of all downlink data transmission occasions in the fourth downlink data transmission occasion set.

Correspondingly, in S505, corresponding to the manner 3 in S504, the UE sends the third codebook in a third uplink time unit, where the third uplink time unit is an uplink slot or sub-slot, the third uplink time unit is determined based on fourth information, and the first DCI includes the fourth information.

Optionally, the maximum quantity of non-overlapping time domain resources included in the first time domain resource set means that K3 time domain resources are selected from the first time domain resource set, and any two of the K3 time domain resources do not overlap. The maximum quantity of non-overlapping time domain resources is equal to a maximum value of K3 that can be found.

Optionally, before the maximum quantity of non-overlapping time domain resources included in the first time domain resource set is determined, a new first time domain resource set is obtained after each time domain resource in the first time domain resource set is translated to one slot, and a maximum quantity of non-overlapping time domain resources included in the new first time domain resource set is determined. For example, for a first time domain resource in the first time domain resource set, if a starting symbol S is greater than or equal to n*A and less than (n+1)*A, where A is a quantity of symbols in one slot, a starting symbol S' of a time domain resource obtained after the first time domain resource is translated is S−n*A.

Optionally, the UE determines at least one slot or sub-slot based on a predefined or higher-layer configured set K1 set of timing offsets from the downlink data channel to the feedback information, and determines, based on a time domain resource position in the first time domain resource set or in a new first time domain resource set, a time domain resource set belonging to the at least one slot or sub-slot. The UE determines, based on the time domain resource set that belongs to the at least one slot or sub-slot, that a maximum quantity of non-overlapping time domain resources included in the time domain resource set form the fourth downlink data transmission occasion set.

Optionally, that the third codebook is corresponding to feedback information of a downlink data transmission occasion in the fourth downlink data transmission occasion set includes: The third codebook is corresponding to a union set of feedback information of downlink data transmission occasions included in a fourth downlink data transmission occasion set corresponding to the at least one slot or sub-slot.

A codebook generated by using the foregoing method includes a union set of at least one time domain resource set corresponding to at least one receiving position, and any two time domain resources in the at least one time domain resource set do not overlap. Therefore, the feedback codebook can be ensured to include feedback information of all potential downlink data transmission, thereby ensuring correct feedback of the feedback information.

Figure 7:
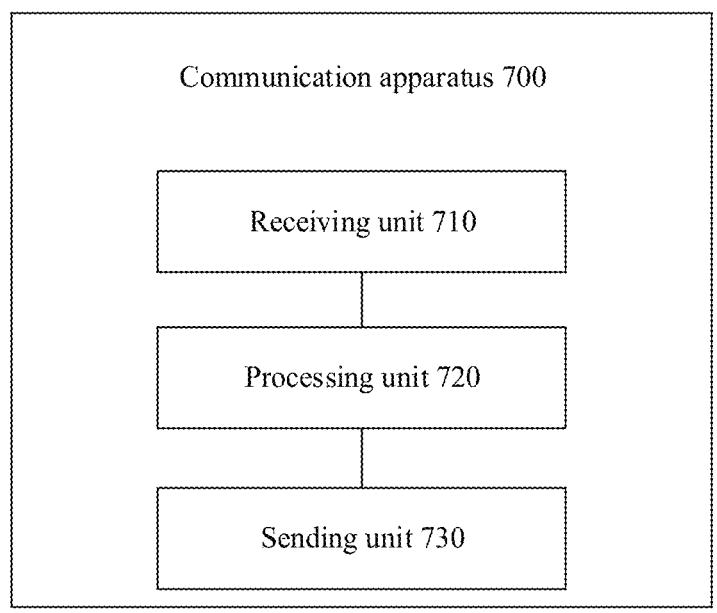
FIG. 7 is a schematic diagram of a structure of a communication apparatus according to an embodiment of this application.
Figure 8:
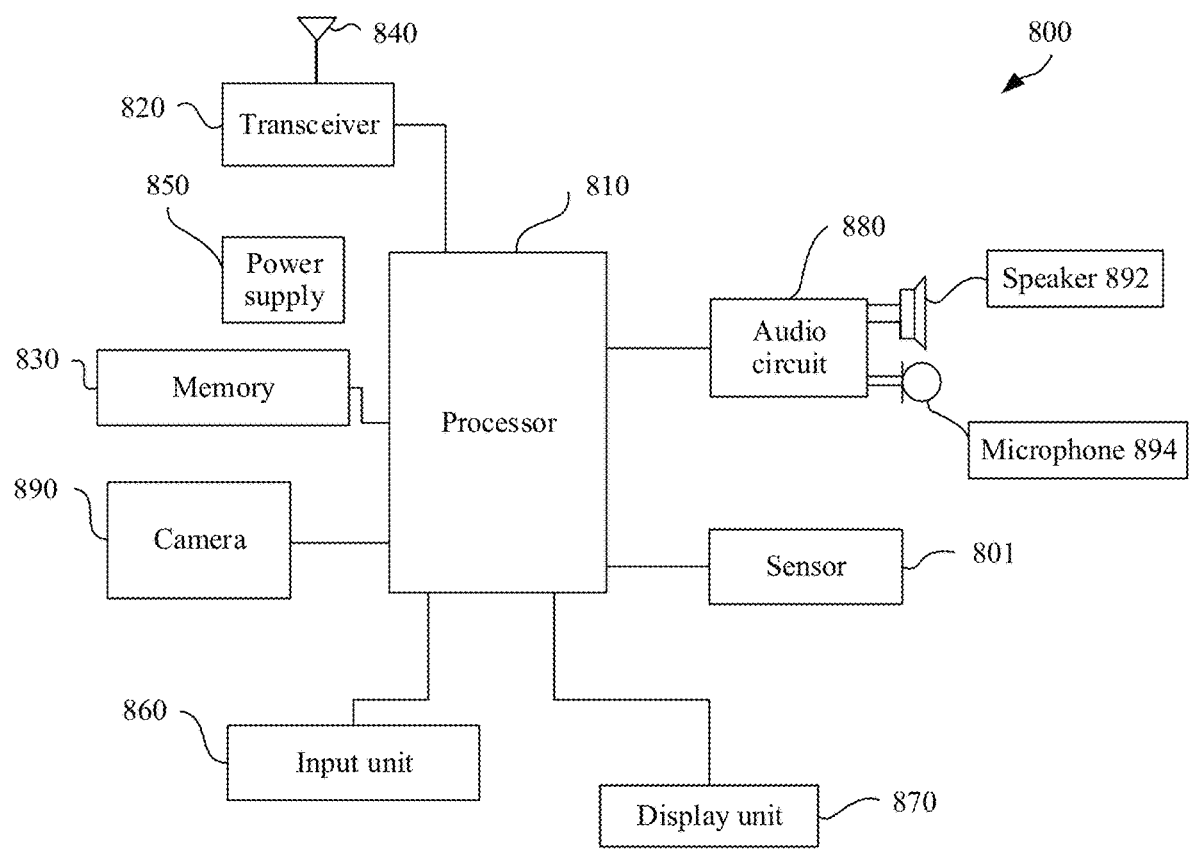
FIG. 8 is a schematic diagram of another structure of a communication apparatus according to an embodiment of this application.
Figure 9:
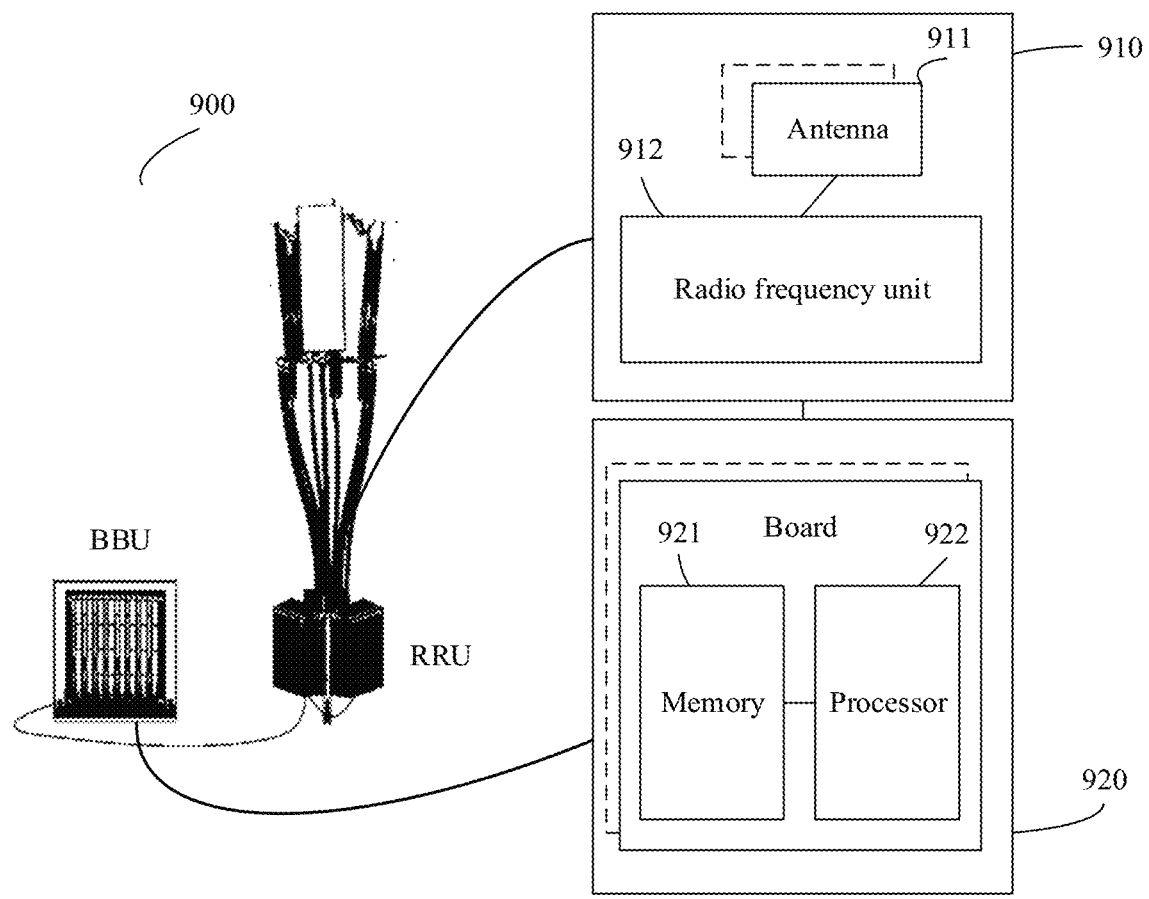
FIG. 9 is a schematic diagram of still another structure of a communication apparatus according to an embodiment of this application.

The following describes in detail a communication apparatus in this application with reference to FIG. 7 to FIG. 9.

FIG. 7 is a schematic block diagram of a communication apparatus 700 according to an embodiment of this application. As shown in FIG. 7, the communication apparatus 700 may include a receiving unit 710 and a sending unit 730.

In a possible design, the communication apparatus 700 may be corresponding to a terminal device (UE) in the foregoing method embodiments, for example, may be a terminal device or a chip disposed in the terminal device. The communication apparatus 700 can perform steps performed by the terminal device in FIG. 3.

For example, a receiving unit 710 is configured to receive first DCI at a first receiving position in at least one receiving position, where the first DCI includes first information, the first information is used to indicate time domain resource allocation, and the at least one receiving position is located in a same slot.

A processing unit 720 is configured to determine a second time domain resource set based on the first receiving position and a first time domain resource set, where the first time domain resource set includes M time domain resources, the first time domain resource set is predefined or is configured by a higher layer parameter, and M is a positive integer greater than or equal to 2.

The processing unit 720 is further configured to determine a second time domain resource based on the first information and the second time domain resource set, where the second time domain resource is one of a plurality of time domain resources included in the second time domain resource set.

The receiving unit 710 or a sending unit 730 is configured to transmit a data channel on the second time domain resource.

Optionally, the processing unit 720 is configured to determine the second time domain resource set based on a first reference symbol and the first time domain resource set, where the first reference symbol is a starting symbol of the first receiving position or the first reference symbol is a sum of an ending symbol of the first receiving position and a first offset, and the first offset is predefined or is configured by a higher layer parameter.

Optionally, the processing unit 720 is configured to determine the second time domain resource set based on a first reference symbol and the first time domain resource set, where a value of the first reference symbol is a first value or a second value, the first value is a symbol 0, the second value is a starting symbol of the first receiving position or the second value is a sum of an ending symbol of the first receiving position and a first offset, and the first offset is predefined or is configured by a higher layer parameter.

Optionally, the receiving unit 710 is further configured to receive a first parameter, where the first parameter indicates that the value of the first reference symbol is the first value or the second value.

Optionally, when a quantity of rows included in the first time domain resource set is greater than or equal to a first threshold, the value of the first reference symbol is the first value; or when a quantity of rows included in the first time domain resource set is less than a first threshold, the value of the first reference symbol is the second value, where the first threshold is predefined or is configured by a higher layer parameter. Alternatively, when the first time domain resource set includes a parameter for a scheduling-delay between a downlink control channel and a data channel, the value of the first reference symbol is the first value; or when the first time domain resource set does not include a parameter for a scheduling-delay between a downlink control channel and a data channel, the value of the first reference symbol is the second value.

Optionally, the processing unit 720 is configured to: determine M first-type time domain resources, where a difference between a starting symbol of an $i^{th}$ time domain resource in the M first-type time domain resources and the first reference symbol is equal to a starting symbol of an $i^{th}$ time domain resource in the first time domain resource set, and a length of the $i^{th}$ time domain resource in the M first-type time domain resources is equal to a length of the $i^{th}$ time domain resource in the first time domain resource set, where i is a positive integer less than or equal to M; and determine M second-type time domain resources based on the M first-type time domain resources, where the second time domain resource set includes the M second-type time domain resources.

Optionally, the starting symbol and an ending symbol of the $i^{th}$ first-type time domain resource belong to a same slot, and an $i^{th}$ second-type time domain resource is the $i^{th}$ first-type time domain resource.

Optionally, when the starting symbol and an ending symbol of the $i^{th}$ first-type time domain resource do not belong to a same slot, a starting symbol of an $i^{th}$ second-type time domain resource is the starting symbol of the $i^{th}$ first-type time domain resource, and an ending symbol of the $i^{th}$ second-type time domain resource is an ending symbol of a slot in which the starting symbol of the $i^{th}$ first-type time domain resource is located; or when the starting symbol and an ending symbol of the $i^{th}$ first-type time domain resource do not belong to a same slot, a starting symbol of an $i^{th}$ second-type time domain resource is the $1^{st}$ symbol of a slot next to a slot in which the starting symbol of the $i^{th}$ first-type time domain resource is located, and a length of the $i^{th}$ second-type time domain resource is equal to a length of the $i^{th}$ first-type time domain resource.

Optionally, the processing unit 720 is further configured to: determine a first downlink data transmission occasion set based on the second time domain resource set, where a quantity of downlink data transmission occasions included in the first downlink data transmission occasion set is equal to a maximum quantity of non-overlapping time domain resources included in the second time domain resource set; determine a second downlink data transmission occasion set, where the second downlink data transmission occasion set is a union set of at least one first downlink data transmission occasion set, and the at least one first downlink data transmission occasion set is determined based on at least one second time domain resource set corresponding to the at least one receiving position that is in the same slot; generate a first codebook, where the first codebook is corresponding to feedback information of a downlink data transmission occasion in the second downlink data transmission occasion set; and send the first codebook in a first uplink time unit, where the first uplink time unit is an uplink slot or sub-slot, the first uplink time unit is determined based on second information, and the first DCI includes the second information.

Optionally, the processing unit 720 is further configured to: determine a third time domain resource set, where the third time domain resource set is a union set of at least one second time domain resource set corresponding to the at least one receiving position that is in the same slot; determine a third downlink data transmission occasion set, where a quantity of downlink data transmission occasions included in the third downlink data transmission occasion set is equal to a maximum quantity of non-overlapping time domain resources included in the third time domain resource set; generate a second codebook, where the second codebook is corresponding to feedback information of all downlink data transmission occasions in the third downlink data transmission occasion set; and send the second codebook in a second uplink time unit, where the second uplink time unit is an uplink slot or sub-slot, the second uplink time unit is determined based on third information, and the first DCI includes the third information.

Optionally, the first DCI is used to schedule ultra-reliable low-latency communication URLLC data; the first DCI is DCI in a first format, where a payload of the DCI in the first format is the smallest in payloads of all formats of DCI for scheduling data transmission; a radio network temporary identifier RNTI of the first DCI is a first RNTI, where the first RNTI is an RNTI other than a cell radio network temporary identifier C-RNTI or a configured scheduling radio network temporary identifier CS-RNTI; a search space in which the first DCI is located belongs to a first search space, where the first search space is predefined or is configured by a higher layer parameter; a control resource set in which the first DCI is located belongs to a first control resource set, where the first control resource set is predefined or is configured by a higher layer parameter; or a value of a first bit field in the first DCI is a first value, where the first bit field is used to indicate a priority or service type of data scheduled by the first DCI.

For another example, the receiving unit 710 is configured to receive first DCI at a first receiving position in at least one receiving position, where the first DCI includes first information, the first information is used to indicate time domain resource allocation, and the at least one receiving position is located in a same slot.

A processing unit 720 is configured to determine a second time domain resource set based on the first receiving position and a first time domain resource set, where the first time domain resource set includes M time domain resources, the first time domain resource set is predefined or is configured by a higher layer parameter, and M is a positive integer greater than or equal to 2.

The processing unit 720 is configured to determine a second time domain resource based on the first information and the second time domain resource set, where the second time domain resource is one of a plurality of time domain resources included in the second time domain resource set.

The receiving unit 710 or a sending unit 730 is configured to transmit a data channel on the second time domain resource.

Optionally, the communication apparatus may be further configured to perform steps performed by the UE in the case 3 in FIG. 3.

In another possible design, the communication apparatus 700 may be corresponding to a base station (an eNodeB) in the foregoing method embodiments, for example, may be a base station or a chip disposed in the base station. The communication apparatus 700 can perform steps performed by the base station in FIG. 3.

For example, a sending unit 730 is configured to send first DCI at a first receiving position in at least one receiving position, where the first DCI includes first information, the first information indicates time domain resource allocation, and the at least one receiving position is located in a same slot.

A receiving unit 710 or the sending unit 730 is configured to transmit a data channel on a second time domain resource, where the second time domain resource is determined based on the first information and a second time domain resource set, and the second time domain resource set is determined based on the first receiving position and a first time domain resource set, where the first time domain resource set includes M time domain resources, the first time domain resource set is predefined or is configured by a higher layer parameter, and M is a positive integer greater than or equal to 2.

Optionally, the apparatus 700 further includes a processing unit 720, configured to determine the second time domain resource set based on a first reference symbol and the first time domain resource set.

Optionally, the first reference symbol is a starting symbol of the first receiving position or the first reference symbol is a sum of an ending symbol of the first receiving position and a first offset, and the first offset is predefined or is configured by a higher layer parameter.

Optionally, the sending unit 730 is further configured to send a first parameter, where a value of the first parameter indicates that a value of the first reference symbol is a first value or a second value, where the first value is a symbol 0, the second value is a starting symbol of the first receiving position or the second value is a sum of an ending symbol of the first receiving position and a first offset, and the first offset is predefined or is configured by a higher layer parameter.

Optionally, when a quantity of rows included in the first time domain resource set is greater than or equal to a first threshold, the value of the first reference symbol is the first value; or when a quantity of rows included in the first time domain resource set is less than a first threshold, the value of the first reference symbol is the second value, where the first threshold is predefined or is configured by a higher layer parameter. Alternatively, when the first time domain resource set includes a parameter for a scheduling-delay between a downlink control channel and a data channel, the value of the first reference symbol is the first value; or when the first time domain resource set does not include a parameter for a scheduling-delay between a downlink control channel and a data channel, the value of the first reference symbol is the second value. The first value is the symbol 0, the second value is the starting symbol of the first receiving position or the second value is the sum of the ending symbol of the first receiving position and the first offset, and the first offset is predefined or is configured by the higher layer parameter.

Optionally, the processing unit 720 is configured to: determine M first-type time domain resources, where a difference between a starting symbol of an $i^{th}$ time domain resource in the M first-type time domain resources and the first reference symbol is equal to a starting symbol of an $i^{th}$ time domain resource in the first time domain resource set, and a length of the $i^{th}$ time domain resource in the M first-type time domain resources is equal to a length of the $i^{th}$ time domain resource in the first time domain resource set, where i is a positive integer less than or equal to M; and determine M second-type time domain resources based on the M first-type time domain resources, where the second time domain resource set includes the M second-type time domain resources.

Optionally, the starting symbol and an ending symbol of the $i^{th}$ first-type time domain resource belong to a same slot, and an $i^{th}$ second-type time domain resource is the $i^{th}$ first-type time domain resource.

Optionally, when the starting symbol and an ending symbol of the $i^{th}$ first-type time domain resource do not belong to a same slot, a starting symbol of an $i^{th}$ second-type time domain resource is the starting symbol of the $i^{th}$ first-type time domain resource, and an ending symbol of the $i^{th}$ second-type time domain resource is an ending symbol of a slot in which the starting symbol of the $i^{th}$ first-type time domain resource is located; or when the starting symbol and an ending symbol of the $i^{th}$ first-type time domain resource do not belong to a same slot, a starting symbol of an $i^{th}$ second-type time domain resource is the $1^{st}$ symbol of a slot next to a slot in which the starting symbol of the $i^{th}$ first-type time domain resource is located, and a length of the $i^{th}$ second-type time domain resource is equal to a length of the $i^{th}$ first-type time domain resource.

Optionally, the processing unit 720 is further configured to: determine a first downlink data transmission occasion set based on the second time domain resource set, where a quantity of downlink data transmission occasions included in the first downlink data transmission occasion set is equal to a maximum quantity of non-overlapping time domain resources included in the second time domain resource set; determine a second downlink data transmission occasion set, where the second downlink data transmission occasion set is a union set of at least one first downlink data transmission occasion set, and the at least one first downlink data transmission occasion set is determined based on at least one second time domain resource set corresponding to the at least one receiving position that is in the same slot; and receive a first codebook, where the first codebook is corresponding to feedback information of a downlink data transmission occasion in the second downlink data transmission occasion set.

Optionally, the processing unit 720 is further configured to: determine a third time domain resource set, where the third time domain resource set is a union set of at least one second time domain resource set corresponding to the at least one receiving position that is in the same slot; determine a third downlink data transmission occasion set, where a quantity of downlink data transmission occasions included in the third downlink data transmission occasion set is equal to a maximum quantity of non-overlapping time domain resources included in the third time domain resource set; and receive a second codebook, where the second codebook is corresponding to feedback information of all downlink data transmission occasions in the third downlink data transmission occasion set.

Optionally, the first DCI is used to schedule ultra-reliable low-latency communication URLLC data; the first DCI is DCI in a first format, where a payload of the DCI in the first format is the smallest in payloads of all formats of DCI for scheduling data transmission; a radio network temporary identifier RNTI of the first DCI is a first RNTI, where the first RNTI is an RNTI other than a cell radio network temporary identifier C-RNTI or a configured scheduling radio network temporary identifier CS-RNTI; a search space in which the first DCI is located belongs to a first search space, where the first search space is predefined or is configured by a higher layer parameter; a control resource set in which the first DCI is located belongs to a first control resource set, where the first control resource set is predefined or is configured by a higher layer parameter; or a value of a first bit field in the first DCI is a first value, where the first bit field is used to indicate a priority or service type of data scheduled by the DCI.

For another example, a sending unit 730 is configured to send first DCI at a first receiving position in at least one receiving position, where the first DCI includes first information, the first information indicates time domain resource allocation, and the at least one receiving position is located in a same slot.

A receiving unit 710 or the sending unit 730 is configured to transmit a data channel on a second time domain resource, where the second time domain resource is determined based on the first information and a second time domain resource set, and the second time domain resource set is determined based on the first receiving position and a first time domain resource set, where the first time domain resource set includes M time domain resources, the first time domain resource set is predefined or is configured by a higher layer parameter, and M is a positive integer greater than or equal to 2.

Optionally, the communication apparatus may further include a processing unit 720, configured to perform steps performed by the base station in the case 3 in FIG. 3.

In another possible design, the communication apparatus 700 may be corresponding to a terminal device (UE) in the foregoing method embodiments, for example, may be a terminal device or a chip disposed in the terminal device. The communication apparatus 700 can perform steps performed by the terminal device in FIG. 4.

A receiving unit 710 is configured to receive first DCI at a first receiving position in at least one receiving position, where the first DCI includes first information, the first information is used to indicate time domain resource allocation, and the at least one receiving position is located in a same slot.

A processing unit 720 is configured to determine, based on the first receiving position, a first time domain resource set corresponding to the first receiving position, where the first time domain resource set is one of at least one time domain resource set configured by a higher layer or predefined.

The processing unit 720 is configured to determine a first time domain resource based on the first information and the first time domain resource set, where the first time domain resource is one of a plurality of time domain resources included in the first time domain resource set.

The receiving unit 710 or a sending unit 730 is configured to transmit a data channel on the first time domain resource.

Optionally, the communication apparatus may be further configured to perform steps performed by the UE in FIG. 4.

In another possible design, the communication apparatus 700 may be corresponding to a base station (an eNodeB) in the foregoing method embodiments, for example, may be a base station or a chip disposed in the base station. The communication apparatus 700 can perform steps performed by the base station in FIG. 4.

A sending unit 730 is configured to send first DCI at a first receiving position in at least one receiving position, where the first DCI includes first information, the first information indicates time domain resource allocation, and the at least one receiving position is located in a same slot.

A receiving unit 710 or the sending unit 730 is configured to transmit a data channel on a first time domain resource, where the first time domain resource is determined based on the first information and a first time domain resource set. The first time domain resource set is one of at least one first time domain resource set configured by a higher layer or predefined.

Optionally, the communication apparatus may further include a processing unit 720, configured to perform steps performed by the base station in FIG. 4.

In another possible design, the communication apparatus 700 may be corresponding to a terminal device (UE) in the foregoing method embodiments, for example, may be a terminal device or a chip disposed in the terminal device. The communication apparatus 700 can perform steps performed by the terminal device in FIG. 5.

A receiving unit 710 is configured to receive first DCI at a first receiving position in at least one receiving position, where the first DCI includes first information, the first information is used to indicate time domain resource allocation, and the at least one receiving position is located in a same slot.

A processing unit 720 is configured to determine a second time domain resource set based on the first receiving position and a first time domain resource set, where the first time domain resource set includes a plurality of time domain resources, and the first time domain resource set is predefined or is configured by a higher layer parameter.

The processing unit 720 is configured to determine a second time domain resource based on the first information and the second time domain resource set, where the second time domain resource is one of a plurality of time domain resources included in the second time domain resource set.

The receiving unit 710 or a sending unit 730 is configured to transmit a data channel on the second time domain resource.

Optionally, the communication apparatus may be further configured to perform steps performed by the UE in FIG. 5.

In another possible design, the communication apparatus 700 may be corresponding to a base station (an eNodeB) in the foregoing method embodiments, for example, may be a base station or a chip disposed in the base station. The communication apparatus 700 can perform steps performed by the base station in FIG. 5.

A sending unit 730 is configured to send first DCI at a first receiving position in at least one receiving position, where the first DCI includes first information, the first information indicates time domain resource allocation, and the at least one receiving position is located in a same slot.

A receiving unit 710 or the sending unit 730 is configured to transmit a data channel on a second time domain resource, where the first time domain resource is determined based on the first information and a first time domain resource set. The first time domain resource set is configured by a higher layer or predefined.

Optionally, the communication apparatus may further include a processing unit 720, configured to perform steps performed by the base station in FIG. 5.

The receiving unit 710 and the sending unit 730 may be included in one transceiver unit.

For specific descriptions of functions performed by the communication apparatus 700, refer to operations performed by the UE or the base station in some embodiments of the method in this application, for example, descriptions in the embodiments in FIG. 3 to FIG. 6. Details are not described again.

FIG. 8 is a schematic diagram of a structure of a communication apparatus 800 according to an embodiment of this application. For example, the communication apparatus 800 may be a terminal device, and is used in the system shown in FIG. 1, to perform a function of the terminal device in the foregoing method embodiments. Alternatively, the communication apparatus may be a chip in a terminal device, a vehicle-mounted communication terminal, a vehicle-mounted communication chip, or the like.

As shown in the figure, the terminal device 800 includes a processor 810 and a transceiver 820. Optionally, the terminal device 800 may further include a memory 830. The processor 810, the transceiver 802, and the memory 830 may communicate with each other through an internal connection path, and transfer a control signal and/or a data signal. The memory 830 is configured to store a computer program. The processor 810 is configured to: invoke the computer program from the memory 830 and run the computer program, to control the transceiver 820 to receive/send a signal.

Optionally, the terminal device 800 may further include an antenna 840, configured to send, by using a radio signal, uplink data or uplink control signaling output by the transceiver 820.

The processor 810 and the memory 830 may be integrated into one processing apparatus. The processor 810 is configured to execute program code stored in the memory 830 to implement the foregoing functions. During specific implementation, the memory 830 may alternatively be integrated into the processor 810, or may be independent of the processor 810. The processor 810 may be corresponding to a processing unit of the communication apparatus 800.

The transceiver 820 may be corresponding to the receiving unit 710 and the sending unit 730 in FIG. 7, and may also be referred to as a communication unit. The transceiver 820 may include a receiver (which is also referred to as a receiver machine or a receiver circuit) and a transmitter (which is also referred to as a transmitter machine or a transmitter circuit). Alternatively, the transceiver 820 may include an input/output circuit. The receiver is configured to receive a signal, and the transmitter is configured to transmit a signal.

It should be understood that, the terminal device 800 shown in FIG. 8 can implement each process of the terminal device in the method embodiments shown in FIG. 3, FIG. 4, and FIG. 5. Operations and/or functions of the modules in the terminal device 800 are separately intended to implement corresponding procedures in the foregoing method embodiments. For details, refer to the descriptions in the foregoing method embodiments. To avoid repetition, detailed descriptions are properly omitted herein.

The processor 810 may be configured to perform an action internally implemented by the terminal device in the foregoing method embodiments, and the transceiver 820 may be configured to perform a sending action by the terminal device for the network device in the foregoing method embodiments or a receiving operation from the network device in the foregoing method embodiments. For details, refer to the descriptions in the foregoing method embodiments. Details are not described herein again.

Optionally, the terminal device 800 may further include a power supply 850, configured to supply power to various components or circuits in the terminal device.

In addition, to make functions of the terminal device more perfect, the terminal device 800 may further include one or more of an input unit 860, a display unit 870, an audio circuit 880, a camera 890, a sensor 801, and the like, and the audio circuit may further include a speaker 882, a microphone 884, and the like.

FIG. 9 is a schematic diagram of a structure of a communication apparatus 900 according to an embodiment of this application, for example, may be a schematic diagram of a structure of a network device. The network device 900 may be used in the system shown in FIG. 1, and perform a function of the base station in the method embodiments.

As shown in the figure, for example, the network device 900 may include one or more radio frequency units such as a remote radio unit (remote radio unit, RRU) 910 and one or more baseband units (baseband units, BBUs) (or referred to as digital units, DUs) 920. The RRU 910 may be referred to as a communication unit or a transceiver unit, and be corresponding to the receiving unit 710 and the sending unit 720 in FIG. 7. Optionally, the transceiver unit 910 may also be referred to as a transceiver machine, a transceiver circuit, a transceiver, or the like, and may include at least one antenna 911 and a radio frequency unit 912.

Optionally, the transceiver unit 910 may include a receiving unit and a sending unit. The receiving unit may be corresponding to a receiver (or referred to as a receiver machine or a receiving circuit), and the sending unit may be corresponding to a transmitter (or referred to as a transmitter machine or a transmitting circuit). For another example, the transceiver unit 910 may be implemented by using a same module, for example, implemented by using a transceiver circuit module. The RRU 910 is mainly configured to: receive and send a radio frequency signal, and perform conversion between the radio frequency signal and a baseband signal, for example, configured to send first information to a terminal device. The BBU 920 is mainly configured to: perform baseband processing, control a network device, and the like. The RRU 910 and the BBU 920 may be physically disposed together, or may be physically separated, namely, a distributed base station.

The BBU 920 may be a control part of the network device, may also be referred to as a processing unit, may be corresponding to the processing unit included in the communication apparatus 600, and is mainly configured to implement a baseband processing function such as channel coding, multiplexing, modulation, or spreading. For example, the BBU (processing unit) may be configured to control a base station to perform an operation procedure related to the network device in the foregoing method embodiments, for example, sending the foregoing configuration information.

In an example, the BBU 920 may include one or more boards, and a plurality of boards may jointly support a radio access network (such as an LTE network) having a single access standard, or may separately support radio access networks (for example, an LTE network, a 5G network, or another network) having different access standards. The BBU 920 further includes a memory 921 and a processor 922. The memory 921 is configured to store necessary instructions and necessary data. The processor 922 is configured to control the network device to perform a necessary action, for example, configured to control the network device to perform an operation procedure related to the network device in the foregoing method embodiments. The memory 921 and the processor 922 may serve the one or more boards. In other words, the memory and the processor may be independently disposed on each board. Alternatively, the plurality of boards may share the same memory and the same processor. In addition, each board may be further provided with a necessary circuit.

It should be understood that, the network device 900 shown in FIG. 9 can implement each process of the base station in the method embodiments in FIG. 3, FIG. 4, and FIG. 5. Operations and/or functions of the modules in the network device 900 are separately intended to implement corresponding procedures in the foregoing method embodiments. For details, refer to the descriptions in the foregoing method embodiments. To avoid repetition, detailed descriptions are properly omitted herein.

The BBU 920 may be configured to perform an action internally implemented by the base station in the foregoing method embodiments, and the RRU 910 may be configured to perform a sending action by the base station for the UE in the foregoing embodiments or a receiving action from the UE in the foregoing method embodiments. For details, refer to the descriptions in the foregoing method embodiments. Details are not described herein again.

An embodiment of this application further provides a processing apparatus, including a processor and an interface.

The processor is configured to perform the method in any one of the foregoing method embodiments.

It should be understood that, the processor in the embodiments of this application may be a central processing unit (central processing unit, CPU), or the processor may be another general-purpose processor, a digital signal processor (digital signal processor, DSP), an application-specific integrated circuit (application-specific integrated circuit, ASIC), a field programmable gate array (field programmable gate array, FPGA) or another programmable logic device, a discrete gate or a transistor logic device, a discrete hardware component, or the like. The general-purpose processor may be a microprocessor, or the processor may be any conventional processor or the like.

It should be further understood that the memory in the embodiments of this application may be a volatile memory or a nonvolatile memory, or may include a volatile memory and a nonvolatile memory. The nonvolatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM), used as an external cache. Through example but not limitative descriptions, many forms of random access memories (random access memories, RAMs) may be used, for example, a static random access memory (static RAM, SRAM), a dynamic random access memory (DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

All or some of the foregoing embodiments may be implemented by using software, hardware, firmware, or any other combination thereof. When the software is used to implement the embodiments, all or some of the foregoing embodiments may be implemented in a form of a computer program product. The computer program product includes one or more computer instructions or computer programs. When the computer instructions or the computer programs are loaded and executed on a computer, the procedures or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium. The semiconductor medium may be a solid-state drive.

As defined in the embodiments of this application, a one-way communication link from an access network to a terminal is a downlink, data transmitted on the downlink is downlink data, and a transmission direction of the downlink data is referred to as a downlink direction; a one-way communication link from the terminal to the access network is an uplink, data transmitted on the uplink is uplink data, and a transmission direction of the uplink data is referred to as an uplink direction.

The resource in the embodiments of this application may also be referred to as a transmission resource, includes one or more of a time domain resource, a frequency domain resource, and a code channel resource, and may be used to carry data or signaling in an uplink communication process or a downlink communication process.

It should be understood that, the term "and/or" in this specification describes only an association relationship for describing associated objects and represents that three relationships may exist. For example, A and/or B may represent the following three cases: Only A exists, both A and B exist, and only B exists. In addition, the character "/" in this specification indicates an "or" relationship between the associated objects.

It should be understood that in the embodiments of the present disclosure, "B corresponding to A" indicates that B is associated with A, and B may be determined based on A. However, it should be further understood that determining B based on A does not mean that B is determined based on only A. B may alternatively be determined based on A and/or other information.

In the embodiments of this application, "a plurality of" means two or more than two.

Descriptions such as "first" and "second" in the embodiments of this application are merely used for indicating and distinguishing between described objects, do not show a sequence, do not indicate a specific limitation on a quantity of devices in the embodiments of this application, and do not constitute any limitation on the embodiments of this application.

In the embodiments of this application, "connection" means various connection manners such as a direct connection or an indirect connection, for implementing communication between devices. This is not limited in the embodiments of this application.

Unless otherwise specified, "transmission" (transmit/transmission) in the embodiments of this application refers to bidirectional transmission, and includes a sending action and/or a receiving action. "Transmission" in the embodiments of this application includes data sending, data receiving, or data sending and receiving. That is, data transmission herein includes uplink data transmission and/or downlink data transmission. Data may include a channel and/or a signal. Uplink data transmission is uplink channel transmission and/or uplink signal transmission, and downlink data transmission is downlink channel transmission and/or downlink signal transmission.

A service (service) in the embodiments of this application is a communication service obtained by a terminal from a network side, and includes a control plane service and/or a data plane service, for example, a voice service or a data traffic service. Sending or receiving of the service includes sending or receiving of service-related data (data) or signaling (signaling).

In the embodiments of this application, a "network" and a "system" express a same concept, and a communication system is a communication network.

It should be understood that sequence numbers of the foregoing processes do not mean execution sequences in various embodiments of this application. The execution sequences of the processes should be determined based on functions and internal logic of the processes, and should not be construed as any limitation on the implementation processes of the embodiments of this application.

A person of ordinary skill in the art may be aware that, in combination with units and algorithm steps in the examples described in the embodiments disclosed in this specification, the embodiments may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in another manner. For example, the described apparatus embodiments are merely examples. For example, division into the units is merely logical function division, and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions in the embodiments.

In addition, function units in the embodiments of this application may be integrated into one processing unit, or each of the units may exist alone physically, or two or more units may be integrated into one unit.

When the functions are implemented in a form of a software function unit and sold or used as an independent product, the functions may be stored in a computer-readable storage medium. Based on such an understanding, the technical solutions of this application essentially, or the part contributing to the current technology, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application. The foregoing storage medium includes: any medium that can store program codes, such as a USB flash disk, a removable hard disk, a read-only memory (read-only memory, ROM), a random access memory (random access memory, RAM), a magnetic disk, or an optical disk.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method performed by a terminal connected to a radio network, comprising:
   receiving, from a network device of the radio network, first downlink control information (DCI) at a first PDCCH monitoring occasion in a slot, the first DCI comprising an index to a corresponding row of a time domain resource allocation table, wherein the corresponding row of the time domain resource allocation table is associated with a target time domain resource in the slot for receiving PDSCH data from the network device;
   obtaining data in the corresponding row of the time resource allocation table, including a starting symbol for the target time domain resource and a K0 parameter
   in case of the K0 parameter having a value set to 0, identifying a location of the target time domain resource in the slot, with the starting symbol of the target time domain resource being numbered relative to a starting symbol of the first PDCCH monitoring occasion in which the first DCI is received, instead of being numbered relative to a starting symbol of the slot;
   in case of the K0 parameter having a value greater than 0, identifying the location of the target time domain resource in a slot, with the starting symbol of the target time domain resource being numbered relative to the starting symbol of the slot; and
   receiving the PDSCH data from the network device using the target time resource at the identified location in the slot.

2. The method according to claim 1, wherein the PDSCH data received using the target time domain resource is ultra-reliable low-latency communication (URLLC) data.

3. A communications apparatus connected to a radio network, comprising:
   at least one processor; and
   one or more memories coupled to the at least one processor and storing programming instructions that, when executed by the at least one processor, cause the apparatus to:
   receive, from a network device of the radio network, first downlink control information (DCI) at a first PDDCH monitoring occasion in a slot, the first DCI comprising an index to a corresponding row of a time domain resource allocation table, wherein the corresponding row of the time domain resource allocation table is associated with a target time domain resource in the slot for receiving PDSCH data from the network device;
   obtain data in the corresponding row of the time resource allocation table, including a starting symbol for the target time domain resource and a K0 parameter;
   in case of the K0 parameter having a value set to 0, identify a location of the target time domain resource in the slot, with the starting symbol of the target time domain resource being numbered relative to a starting symbol of the first PDCCH monitoring occasion in which the first DCI is received, instead of being numbered relative to a starting symbol of the slot;

in case of the K0 parameter having a value greater than 0, identify the location of the target time domain resource in a slot, with the starting symbol of the target time domain resource being numbered relative to the starting symbol of the slot; and receive the PDSCH data from the network device using the target time resource at the identified location in the slot.

4. The apparatus according to claim 3, wherein the PDSCH data received using the target time domain resource is ultra-reliable low-latency communication (URLLC) data.

5. A network device of a radio network, comprising: at least one processor, and one or more memories coupled to the at least one processor and storing programming instructions that, when executed by the at least one processor, cause the network device to:

send, to a terminal at a first PDCCH monitoring occasion in a slot, first downlink control information (DCI), wherein the first DCI comprises an index to a corresponding row of a time domain resource allocation table, the corresponding row of the time domain resource allocation table is associated with a target time domain resource in the slot for the terminal to receive PDSCH data from the network device, and includes a starting symbol for the target time domain resource and a K0 parameter, setting the K0 parameter to have a value of 0 or greater than 0, wherein the K0 parameter having a value of 0 indicates to the terminal that a location of the target time domain resource in the slot is to be determined with the starting symbol for the target time domain resource being numbered relative to a starting symbol of the first PDCCH monitoring occasion in which the first DCI is sent, instead of being numbered relative to a starting symbol of the slot, the K0 parameter having a value greater than 0 indicates to the terminal that the location of the target time domain resource in a slot is to be determined with the starting symbol for the target time domain resource being numbered relative to the starting symbol of the slot; and transmitting the PDSCH data to the terminal using the target time domain resource in the slot.

6. The network device according to claim 5, wherein the PDSCH data transmitted to the terminal using the target time domain resource is ultra-reliable low-latency communication (URLLC) data.

* * * * *